(12) United States Patent
von der Embse

(10) Patent No.: US 7,680,211 B1
(45) Date of Patent: Mar. 16, 2010

(54) MIMO MAXIMUM-LIKELIHOOD SPACE-TIME ARCHITECTURE

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 356 days.

(21) Appl. No.: 11/131,464

(22) Filed: May 18, 2005

(51) Int. Cl.
*H04L 27/00* (2006.01)
(52) U.S. Cl. ...................... 375/299; 375/130
(58) Field of Classification Search .............. 375/130, 375/260, 144, 267, 299, 347, 349
See application file for complete search history.

(56) References Cited

U.S. PATENT DOCUMENTS

| | | | | |
|---|---|---|---|---|
| 2004/0001564 A1* | 1/2004 | Chan et al. | ................... | 375/341 |
| 2005/0237971 A1* | 10/2005 | Skraparlis | ................... | 370/329 |
| 2005/0243942 A1* | 11/2005 | Sawai | ................... | 375/267 |
| 2005/0249302 A1* | 11/2005 | Leshem et al. | ................ | 375/267 |
| 2008/0037681 A1* | 2/2008 | Walton et al. | ................ | 375/267 |
| 2008/0069015 A1* | 3/2008 | Walton et al. | ................ | 370/280 |

* cited by examiner

*Primary Examiner*—Emmanuel Bayard

(57) ABSTRACT

A method for constructing architectures for multiple input transmit and multiple output receive (MIMO) systems with generalized orthogonal space-time codes ($C_o$) and generalizations ($H_o$) of the transmission matrix (H) that enable the MIMO equation to be written $Y=H_o \circ C_o \circ X + N_o$ which factors out the input signal symbol vector X and allows a direct maximum-likelihood calculation of the estimate $\hat{X}$ of X, and where Y is the received symbol vector and $N_o$ is the received noise vector. The architectures spread the users uniformly over the transmission paths to provide improved bit error rate performance and are developed to support code division multiple access (CDMA) and variations including multi-carrier CDMA (MC-CDMA) for equalization, orthogonal frequency division multiple access (OFDMA), and orthogonal Wavelet division multiple access (OWDMA) using waveforms that include multi-resolution Wavelets and with Walsh, Hybrid Walsh, generalized Hybrid Walsh orthogonal and quasi-orthogonal codes for CDMA and MC-CDMA and variations.

5 Claims, 27 Drawing Sheets

21 — Scenario 1A: $L=2, R=1, M=1, N=2, T=2$

22 — $H_0 = $ 2x4 space-time transmission matrix over $T=2$ epochs $$H_0 = \begin{bmatrix} H & 0 \\ 0 & H \end{bmatrix} \begin{matrix} T=1 \\ T=2 \end{matrix}$$

where $H = [h_1\ h_2]$ 1x2 transmission matrix over $T=1$ time epoch

23 — $C_0 = A \circ B$ 4x2 space-time code

24 — $A = \begin{bmatrix} A_1 & 0 \\ 0 & A_2 \end{bmatrix} = 4 \times 4,$ $A_1 = \begin{bmatrix} 1 & 0 \\ 0 & -1 \end{bmatrix}, \quad A_2 = \begin{bmatrix} 1 & 0 \\ 0 & 1 \end{bmatrix}$ — 25

26 — $B = \begin{bmatrix} B_1 \\ B_2 \end{bmatrix} = 4 \times 2,$ $B_1 = \begin{bmatrix} 1 & 0 \\ 0 & L \end{bmatrix}, \quad B_2 = \begin{bmatrix} 0 & 1 \\ L & 0 \end{bmatrix}$ $L$ = complex conjugate linear operator — 27

FIG. 3A

28 — MIMO equation $Y = H_0 \cdot C_0 \cdot X + N_o$ where $Y = \begin{bmatrix} Y_1 \\ Y_2 \end{bmatrix}$  29  $X = \begin{bmatrix} X_1 \\ X_2 \end{bmatrix}$

30

$= \begin{bmatrix} h_1 & -h_2 \cdot L \\ h_2 \cdot L & h_1 \end{bmatrix} \begin{bmatrix} X_1 \\ X_2 \end{bmatrix} + N_o$ $= \begin{bmatrix} h_1 \cdot X_1 - h_2 \cdot X_2^* \\ h_2 \cdot X_1^* + h_1 \cdot X_2 \end{bmatrix} + N_o$ $= \begin{bmatrix} H \\ H \end{bmatrix} \cdot C + N_o$ —— 31

32 —— $C = \begin{bmatrix} X_1 & X_2^* \\ -X_2^* & X_1^* \end{bmatrix}$ = Alamouti's 2x2 space-time code

FIG. 3B

33 —— Solution for the estimate $\hat{X}$ of X $$\hat{X}_1 = (|h_1|^2 + |h_2|^2)^{-1} \cdot (h_1^* \cdot Y_1 + h_2 \cdot Y_2^*)$$

$$\hat{X}_2 = (|h_1|^2 + |h_2|^2)^{-1} \cdot (h_1^* \cdot Y_2 - h_2 \cdot Y_1^*)$$

34 —— Space-time code orthogonality $$C' \cdot C = (|X_1|^2 + |X_2|^2) \cdot \begin{bmatrix} 1 & 0 \\ 0 & 1 \end{bmatrix}$$

where $C_0 = \begin{bmatrix} 1 & 0 \\ 0 & 1 \end{bmatrix} \begin{bmatrix} 0 & -L \\ L & 0 \end{bmatrix}$ $$C_0' \cdot C_0 = 2 \cdot \begin{bmatrix} 1 & 0 \\ 0 & 1 \end{bmatrix} \quad L \cdot L = 1$$

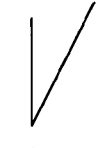

41 — Scenario 1B: L=3, R=1, M=1, N=2, T=3

42 — $H_0$ = 3x9 space-time transmission matrix over T=3 time epochs $$H_0 = \begin{bmatrix} H & 0 & 0 \\ 0 & H & 0 \\ 0 & 0 & H \end{bmatrix} \begin{matrix} T=1 \\ T=2 \\ T=3 \end{matrix}$$

where $H = [h_1 \ h_2 \ h_3]$ 1x3 transmission matrix over T=1 time epoch

43 — $C_0 = A \bullet B$  9x3 space-time code $$= \begin{bmatrix} A_1 \bullet B_1 \\ A_2 \bullet B_2 \\ A_3 \bullet B_3 \end{bmatrix}$$

44

$$A = \begin{bmatrix} A_1 & 0 & 0 \\ 0 & A_2 & 0 \\ 0 & 0 & A_3 \end{bmatrix} \qquad B = \begin{bmatrix} B_1 \\ B_2 \\ B_3 \end{bmatrix}$$

FIG. 4A $$A_1 = \begin{bmatrix} 1 & 0 & 0 \\ 0 & 1 & 0 \\ 0 & 0 & 1 \end{bmatrix}, \quad A_2 = \begin{bmatrix} 1 & 0 & 0 \\ 0 & -1 & 0 \\ 0 & 0 & 1 \end{bmatrix}, \quad A_3 = \begin{bmatrix} 1 & 0 & 0 \\ 0 & 1 & 0 \\ 0 & 0 & -1 \end{bmatrix}$$

45 ───

$$B_1 = \begin{bmatrix} 1 & 0 & 0 \\ 0 & 1 & 0 \\ 0 & 0 & 1 \end{bmatrix}, \quad B_2 = \begin{bmatrix} 0 & 1 & 0 \\ 1 & 0 & 0 \\ 0 & 0 & 1 \end{bmatrix}, \quad B_3 = \begin{bmatrix} 0 & 1 & 0 \\ 0 & 0 & 1 \\ 1 & 0 & 0 \end{bmatrix}$$

46 ───

$$C_0 = \begin{bmatrix} 1 & 0 & 0 & 0 & 0 & 1 & 0 & 1 & 0 \\ 0 & 1 & 0 & 1 & 0 & 0 & 0 & 0 & -1 \\ 0 & 0 & 1 & 0 & -1 & 0 & 1 & 0 & 0 \end{bmatrix}$$

MIMO equation $Y = H_0 \bullet C_0 \bullet X + N_o$ where $Y = \begin{bmatrix} Y_1 \\ Y_2 \\ Y_3 \end{bmatrix}$, $X = \begin{bmatrix} X_1 \\ X_2 \\ X_3 \end{bmatrix}$ $= \begin{bmatrix} h_1 & h_2 & h_3L \\ h_3L & h_1 & -h_2 \\ h_2 & -h_3L & h_1 \end{bmatrix} \begin{bmatrix} X_1 \\ X_2 \\ X_3 \end{bmatrix} + N_o$ $= \begin{bmatrix} h_1 & h_2 & 0 \\ 0 & h_1 & -h_2 \\ h_2 & 0 & h_1 \end{bmatrix} \begin{bmatrix} X_1 \\ X_2 \\ X_3 \end{bmatrix} + \begin{bmatrix} 0 & 0 & h_3 \\ h_3 & 0 & 0 \\ 0 & -h_3 & 0 \end{bmatrix} \begin{bmatrix} X_1^* \\ X_2^* \\ X_3^* \end{bmatrix} + N_o$ $= H_1 \bullet X + H_2 \bullet L[X] = H_1 \bullet X + H_2 \bullet X^*$

49 — Solution for the estimate $\hat{X}$ of $X$ $$\hat{X} = [H_2^{-1} \bullet H_1 - H_1^{-1*} \bullet H_2^*]^{-1} \bullet [H_2^{-1} - H_1^{-1*} \bullet L] \bullet Y$$
$$= [H_2^{-1} \bullet H_1 - (H_1^{-1} \bullet H_2)^*]^{-1} \bullet [H_2^{-1} - H_1^{-1*} \bullet L] \bullet Y$$

where $H_1 + H_2 \bullet L = H_0 \bullet C_0$

50 — Solution for $\hat{X}$ when the linear operator $L$ is absent $$\hat{X} = [H_0 \bullet C_0]^{-1} \bullet Y \qquad \text{for } \det(H_0 \bullet C_0) \neq 0$$

51 — Space-time code orthogonality $$C_0' C_0 = 3 \bullet \begin{bmatrix} 1 & 0 & 0 \\ 0 & 1 & 0 \\ 0 & 0 & 1 \end{bmatrix}$$

FIG. 4D

61 — Scenario 2: L=2, R=2, M=4, N=4, T=2

62 — $H_0$ = 8x8 space-time transmission matrix over T=2 time epoch $$= \begin{bmatrix} H & 0 \\ 0 & H \end{bmatrix} \begin{matrix} T=1 \\ T=2 \end{matrix}$$

where H = 4x4 transmission matrix over T=1 time epoch $$= \begin{bmatrix} h(1,1) & h(1,2) & h(1,3) & h(1,4) \\ h(2,1) & h(2,2) & h(2,3) & h(2,4) \\ h(3,1) & h(3,2) & h(3,3) & h(3,4) \\ h(4,1) & h(4,2) & h(4,3) & h(4,4) \end{bmatrix}$$

63 — $C_0$ = 8x4 space-time code

= A•B

= B    since A = 8x8 identity matrix

FIG. 5A

64 —— $C_0 = B = \begin{bmatrix} B_1 \\ B_2 \end{bmatrix}$  where  $B_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$,  $B_2 = \begin{bmatrix} 0 & 0 & 0 & 1 \\ 0 & 1 & 0 & 0 \\ 0 & 0 & 1 & 0 \\ 1 & 0 & 0 & 0 \end{bmatrix}$ 65 —— MIMO equation $Y = H_0 \cdot C_0 \cdot X + N_0$  where  $Y = \begin{bmatrix} Y_1(1) \\ Y_2(1) \\ Y_3(1) \\ Y_4(1) \\ Y_1(2) \\ Y_2(2) \\ Y_3(2) \\ Y_4(2) \end{bmatrix}$,  $X = \begin{bmatrix} X_1 \\ X_2 \\ X_3 \\ X_4 \end{bmatrix}$

FIG. 5B

66 — Solution for the estimate $\hat{X}$ of X $\hat{X} = (1/4) \cdot C_0' \cdot H_0^{-1} \cdot Y$ for $\det(H) \neq 0 \Rightarrow \det(H_0) \neq 0$ 67 — Space-time code orthogonality $C_0'C_0 = 4 \cdot \begin{bmatrix} 1 & 0 & 0 & 0 \\ 0 & 1 & 0 & 0 \\ 0 & 0 & 1 & 0 \\ 0 & 0 & 0 & 1 \end{bmatrix}$

FIG. 5C

71 —— Scenario 3: L=2, R=4, M=8, N=4, T=1

72 —— $H_0$ = 8x4 space-time transmission matrix over T=1 time epoch $$= H = \begin{bmatrix} h(1,1) & \cdots & h(1,4) \\ \vdots & & \vdots \\ h(8,1) & \cdots & h(8,4) \end{bmatrix}$$

73 —— $C_0$ = 4x4 space-time code

= 4 column code vectors from the hybrid Walsh 4x4 code matrix $$= \begin{bmatrix} 1 & 1 & 1 & 1 \\ 1 & -j & -1 & -j \\ 1 & -1 & 1 & -1 \\ 1 & -j & -1 & j \end{bmatrix}$$

FIG. 6A

74 — MIMO equation $$Y = H_0 \cdot C_0 \cdot X + N_0 \quad \text{where} \quad Y = \begin{bmatrix} Y_1 \\ Y_2 \\ Y_3 \\ Y_4 \\ Y_5 \\ Y_6 \\ Y_7 \\ Y_8 \end{bmatrix}, \quad X = \begin{bmatrix} X_1 \\ X_2 \\ X_3 \\ X_4 \end{bmatrix}$$

75 — Solution for the estimate $\hat{X}$ of X $$\hat{X} = (1/4) \cdot C_0' \cdot (H_0' \cdot H_0)^{-1} \cdot H_0' \cdot Y \quad \text{for} \quad \det(H' \cdot H) \neq 0 \Rightarrow \det(H_0' \cdot H_0) \neq 0$$

76 — Space-time code orthogonality $$C_0' C_0 = 4 \cdot I \quad \text{where} \quad I = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

FIG. 6B

81 —— Scenario 4: L=1, R=8, M=8, N=8, T=1

82 —— $H_0 = H = $ 8x8 transmission matrix over T=1 time epoch $$H_0 = \begin{bmatrix} h(1,1) & \cdots & h(1,8) \\ \vdots & & \vdots \\ h(8,1) & \cdots & h(8,8) \end{bmatrix}$$

83 —— $C_0 = $ 8x8 space-time code

= 8 column code vectors from the hybrid Walsh 8x8 code matrix $$C_0 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

FIG. 7A

84 — MIMO equation $$Y = H_0 \cdot C_0 \cdot X + N_o \quad \text{where} \quad Y = \begin{bmatrix} Y_1 \\ Y_2 \\ Y_3 \\ Y_4 \\ Y_5 \\ Y_6 \\ Y_7 \\ Y_8 \end{bmatrix}, \quad X = \begin{bmatrix} X_1 \\ X_2 \\ X_3 \\ X_4 \\ X_5 \\ X_6 \\ X_7 \\ X_8 \end{bmatrix}$$

85 — Solution for the estimate $\hat{X}$ of X $$\hat{X} = (1/8) \cdot C_0' \cdot H_0^{-1} \cdot Y \quad \text{for } \det(H) \neq 0 \Rightarrow \det(H_0) \neq 0$$

86 — Space-time code orthogonality $$C_0' C_0 = 8 \cdot I \quad \text{where} \quad I = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

FIG. 7B

MIMO equation    $Y = H_0 \circ C_0 \circ X + N_o$

| | Scenario | | | | Solution | | |
|---|---|---|---|---|---|---|---|
| No. | M,N | Diversity L | Rate R | Epochs T | Ex. FIG. | Requirements on $H_0$, $C_0$ | Space-time Tx matrix | ML Solution |
| 1 | M<N | >1 | 1 | >1 | 3, 4 | $\det(H_0 \circ C_0) \neq 0$ & $C_0' \circ C_0 = N \circ I$ | $H_0 = \Lambda(H)$ | $\hat{X} = [H_0 \circ C_0]^{-1} \circ Y$<br>See Note below |
| 2 | M=N | >1 | >1 | >1 | 5 | | | |
| 3 | M>N | >1 | >1 | 1 | 6 | $\det(H_0' \circ H_0) \neq 0$ & $C_0' \circ C_0 = N \circ I$ | $H_0 = H$ | $\hat{X} = N^{-1} \circ C_0' \circ [H_0' \circ H_0]^{-1} \circ H_0' \circ Y$ |
| 4 | M=N | 1 | >1 | 1 | 7 | $\det(H_0) \neq 0$ & $C_0' \circ C_0 = N \circ I$ | $H_0 = H$ | $\hat{X} = N^{-1} \circ C_0' \circ H_0^{-1} \circ Y$ |

Note: These simplified solutions apply when the linear operator L is absent.
With L the solutions are  $\hat{X} = [H_2^{-1} \circ H_1 - H_1 \star^{-1} \circ H_2 \star]^{-1} \circ [H_2^{-1} - H_1 \star^{-1} \circ L] \circ Y$ wherein  $H_0 \circ C_0 = H_1 + H_2 \circ L$

FIG. 8

MIMO MAXIMUM-LIKELIHOOD SPACE-TIME ARCHITECTURE

CROSS-REFERENCE TO RELATED APPLICATIONS

U.S. Patent Documents

| | | |
|---|---|---|
| U.S. Pat. No. 6,804,307 | October 2004 | Popović, Branislav SE |
| U.S. Pat. No. 6,798,737 | September 2004 | Dabak et.al. |
| U.S. Pat. No. 6,731,618 | May 2004 | Chung et.al. |
| U.S. Pat. No. 6,731,668 | May 2004 | John Ketchum |
| U.S. Pat. No. 6,728,517 | April 2004 | Sugar et.al. |
| U.S. Pat. No. 6,711,528 | March 2004 | Dishman et.al. |
| U.S. Pat. No. 6,687,492 | February 2004 | Sugar et.al. |
| U.S. Pat. No. 6,674,712 | January 2004 | Yang et.al. |
| U.S. Pat. No. 6,647,078 | November 2003 | Thomas et.al. |
| U.S. Pat. No. 6,636,568 | October 2003 | Tamer Kadous |
| U.S. Pat. No. 6,504,506 | January 2003 | Thomas et.al. |
| U.S. Pat. No. 6,426,723 | July 2003 | Smith et.al. |
| U.S. Pat. No. 6,144,711 | November 2000 | Raleigh et.al. |
| U.S. Pat. No. 6, 662,024 | December 2003 | Walton et.al. |
| U.S. Pat. No. 6, 611,231 | August 2003 | Crilly et.al. |
| U.S. Pat. No. 6,636,568 | October 2003 | Tamer Kadous |
| U.S. Pat. No. 6,654,719 | November 2003 | Constantinos Papadias |
| U.S. Pat. No. 6,556,173 | April 2003 | Moustakas et.al. |
| U.S. Pat, No. 6,396,804 | May 2002 | Oldenwalder, Joseph P. |
| U.S. Pat. No. 6,389,138 | May 2002 | Li et.al. |
| U.S. Pat. No. 6,362,781 | March 2002 | Thomas et.al. |
| U.S. Pat. No. 6,185,246 | February 2002 | Gilhousen et.al. |
| application Ser. No. 2002/0126,741 | September 2002 | Baum et.al. |
| U.S. Pat. No. 6,317,466 | November 2001 | Fuschini et.al. |
| U.S. Pat. No. 6,317,413 | November 2001 | Honkasalo, Zhi-Chun |
| U.S. Pat. No. 6,167,079 | December 2000 | Kinnunen et.al. |
| U.S. Pat. No. 6,157,611 | December 2000 | Shanbhag, Abhijit G. |
| U.S. Pat. No. 6,088,347 | August 2000 | Minn et.al. |
| U.S. Pat. No. 5,956,345 | September 1999 | Alipress et.al |
| U.S. Pat. No. 5,943,361 | August 1999 | Gilhousen et.al. |
| U.S. Pat. No. 5,946,344 | August 1999 | Warren et.al. |
| U.S. Pat. No. 5,862,453 | January 1999 | Love et.al. |
| U.S. Pat. No. 5,805,567 | September 1998 | Ramesh, Nallepilli S. |
| U.S. Pat. No. 5,715,236 | February 1998 | Gilhousen et.al. |
| U.S. Pat. No. 5,442,625 | August 1995 | Gitlin et.al. |
| U.S. Pat. No. 5,311,176 | May 1994 | Gurney, David P. |
| U.S. Pat. No. 5,103,459 | April 1992 | Gilhousen et.al. |

U.S. Patent Applications

| | | |
|---|---|---|
| application Ser. No. 10/806,016 | March 2004 | Urbain von der Embse |
| application Ser. No. 10/772,597 | February 2004 | Urbain von der Embse |
| application Ser. No. 10/266,257 | October 2002 | Urbain von der Ernbse |
| application Ser. No. 10/266,256 | October 2002 | Urbain von der Embse |
| application Ser. No. 09/846,410 | February 2001 | Urbain von der Embse |
| application Ser. No. 09/826,118 | January 2001 | Urbain von der Embse |
| application Ser. No. 09/826,117 | January 2001 | Urbain von der Embse |

OTHER PUBLICATIONS

"Broadband CDMA Techniques", by Adachi et. al., pp. 8-18, IEEE Wireless Communications, April 2005, Vol. 12, No. 2

"Special Issue on MIMO Wireless Communications", IEEE Trans. on Signal Processing, November 2003, Vol. 51, No. 11

"Special Issue on Space-Time Transmission, Reception, Coding and Signal Processing", IEEE Trans. on Info. Theory, October 2003, Vol. 49, No. 10

"MIMO Systems and Applications, Part I", the IEEE Journal on Selected Areas in Communications, April 2003, Vol. 21, No. 3

"Mathematical Statistics" by Furgeson, Academic Press, 1967

"A simple transmit diversity technique for wireless communications", S. Alamouti, IEEE J. Select Areas Commun. vol. 16 pp. 1451-1455 October 1998, "V-BLAST: An architecture for realizing very high data rates over the rich-scattering wireless channel" by Wolniansky et. al. in Proc. URSI Int. Symp. Signals, Systems, Electronics, Pisa, Italy, September-October 1998 pp. 295-300, "Turbo coding, turbo equalization, and space-time coding" by Hanzo et. al. IEEE Press, John Wiley & Sons, 2002

"Adaptive wireless transceivers: Turbo-coded, turbo-equalized and space-time coded TDMA, CDMA, OFDMA systems' by Hanzo et. al. IEEE Press, John Wiley & Sons, 2002

"Multiple Access for Broadband Networks", IEEE Communications magazine July 2000 Vol. 38 No. 7

"Third Generation Mobile Systems in Europe", IEEE Personal Communications April 1998 Vol. 5 No. 2

"Transmit Diversity in 3G CDMA Systems", R. T. Derryberry, S. D. Gray, D. M. Ionescu, G. Mandyam, B. Raghothaman, Nokia Research Center, 6000 Connection Drive, Irving Tex. 75039, posted on Internet

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

I. Field of the Invention

The present invention relates to code division multiple access (CDMA) including multicarrier CDMA (MC-CDMA) used for scintillation, dispersion, fading, and multipath environments and other variations to CDMA, orthogonal frequency division multiple access (OFDMA), and orthogonal Wavelet division multiple access (OWDMA) for cellular telephone and wireless data communications with data rates up to multiple T1 (1.544 Mbps) and higher (>100 Mbps), and to optical CDMA. Applications are mobile, point-to-point and satellite communication networks, data compression, pattern recognition, media image compression and processing, and radar More particularly, the present invention relates to the application of CDMA, OFDMA, and OWDMA to multiple input transmit and multiple output receive (MIMO) cellular communications using high speed downlink (or uplink) packet access (HSPDA), IEEE 802.16d WiMax, IEEE 802.11g Wi-Fi, IEEE 802.15 UWB, 3G, 4G, and the other cellular standards.

II. Description of the Related Art

Current cellular communications representative networks are illustrated in FIG. 1 with a schematic layout of part of a cellular network which depicts cells 1,2,3,4 that partition this portion of the area coverage of the network, depicts a user (network user) 5 located within a cell with forward and reverse communications links 6 with the cell-site base station (access point/hub) 7, depicts the base station communication links 8 with the MSC (mobile switching center) or the WSC (wireless switching center) 9, and depicts the MSC/WSC communication links with another base station (access point/hub) 17, with another MSC/WSC 16, and with external elements 10,11,12,13,14,15. One or more base stations are assigned to each cell or multiple cells or sectors of cells depending on the application. One of the base stations 9 in the network serves as the MSC/WSC which is the network system controller and switching and routing center that controls all of user timing, synchronization, and traffic in the network and with all external interfaces including other MSC's. External interfaces could include satellite 10, PSTN (public switched telephone network) 11, LAN (local area network) 12, PAN (personal area network) 13, UWB (ultra-wideband network) 14, and optical networks 15. As illustrated in the figure, base station 7 is the nominal cell-site station for cells i−2, i−1, i, i+1 identified as 1,2,3,4, which means it is intended to service these cells with overlapping coverage from other base stations (access points/hubs). The cell topology and coverage depicted in the figure are intended to be illustrative and the actual cells could be overlapping and of differing shapes. Cells can be sub-divided into sectors. Not shown are possible subdivision of the cells into sectors and/or combining the cells into sectors. Each user in a cell or sector communicates with a base station which should be the one with the strongest signal and with available capacity. When mobile users cross over to other cells and/or are near the cell boundary a soft handover scheme is employed for CDMA in which a new cell-site base station is assigned to the user while the old cell-site base station continues to service the user for as long as required by the signal strength.

Improvements in data rate and/or spatial diversity for application to cellular communications including the communications links 6 in FIG. 1 between a user 5 located within a cell with forward and reverse communications with the cell-site access point/hub (base station) 7, have been demonstrated with the use of multiple-input multiple-output MIMO systems. MINO applies to scenarios which have random scintillation, dispersion, fading, and multipath communication links (channels) with low-correlation statistics, that ensures some of the channels will be independent and can support higher data rates and/or path diversity.

FIG. 2 depicts a representative MIMO scenario for N transmit (Tx) antennas and M receive (Rx) antennas for the forward communications link for cellular communications 6 from the access point or hub 7 to the network user 5 in FIG. 1. Antenna elements for Tx include the digital-to-analog conversion, modulator, up-converter, transmit amplifier and antenna elements, and for Rx include the antenna elements, down-conversion, demodulator, analog-to-digital conversion, and symbol detection. All links use the same frequency spectrum unless noted. Both data rate increase and/or spatial diversity require the solution of a linear set of equations which measure the transmission coefficients between the input signals X 13 to the N Tx antennas 15 and the received output signals Y 17 from the M Rx antennas 16.

In FIG. 2 transmission starts with the input Tx data d 11 which is encoded, interleaved, formatted, and symbol encoded 12 to generate the input signal (symbol) vector X 13 whose elements are the encoded data symbols from 12. Turbo encoding provides the best performance over the fading and scintillated links and is one of several choices including convolutional and block encoding. Tx symbol vector X is handed over to a space-time encoder 14 whose output is the space-time code C followed by symbol modulation and hand-over to the Tx processing for transmission by the Tx antennas 15. The N Tx antenna transmissions over the fading and scintillation paths 16 are received by the M Rx antennas and each Tx-to-Rx link is a communications channel. Statistics of these Tx-to-Rx communications channels are assumed to be relatively constant over a usable burst of communications which means the data burst can be demodulated at the Rx receiver knowing the set of channel transmission coefficients $\{h_{ij}=h(i,j)\}$ where $h_{ij}=h(i,k)$ is the complex coefficient measuring the amplitude and phase change of the channel between the transmit Tx antenna "i" and the received Rx antenna "j" which is due to transmission path scintillation, dispersion, fading, multipath, and anomalies other than the direct path transmission propagation loss in clear air. These channel coefficients are elements of the M×N transmission matrix $H=[h_{ij}=h(i,k)]$ which means the Rx signal (symbol) vector Y 17 is defined by the MIMO equation $Y=H \circ X+N_o$ for each symbol set or time epoch T when there is no space-time coding and where Y is M×1, H is M×N, X is N×1, "∘" is a multiply operation, M×N is the size of the M by N matrix, M×1 is an M×1 dimension vector, N×1 is an N by 1 dimension vector, and $N_o$ is the additive noise seen in the Rx receiver which includes the Rx link, thermal, amplifier, and signal processing noise sources. For a burst of T symbol sets with no diversity the dimensions increase to M×T matrix Y, N×T matrix X, and M∘T×N∘T matrix $\underline{H}$ which is constructed such that each column vector Y(i) of Y and each column vector X(i) of X are related by the system equation Y(i)=H•X(i) for T=i symbol set. Symbol set time intervals T or epochs T measure the sequencing of the input signal sets. With space-time encoding for diversity applications the MIMO equation is over T>1 time epochs for each symbol set whereupon the MIMO equation is $Y=H \cdot C+N_o$ where the space-time code matrix C includes the components of X and extends over these time epochs for each symbol set. The Rx signal Y 17 is space-time decoded to generate the estimate $\hat{X}$ 27 of X which is then de-interleaved and turbo decoded 18 to generate the Rx estimate $\hat{d}$ 19 of the transmitted data d. Space-time decoding only applies to diversity applications and for data rate increases the space-time decoding is replaced by a de-multiplexing operation.

MIMO applications are grouped into data rate and diversity improvements. Data rate improvement R is the ratio of the data rate with MIMO to the data rate with a single Tx-to-Rx communications link where data rate is in bits per second. Diversity improvement L is the order or degree of diversity equal to the number of parallel and independent Tx-to-Rx communication channels provided by MIMO for each user. Bound on data rate improvement is R≦min(M,N), bound on diversity is L≦max(M,N)/R, constraints on the scenario include the requirement M≦N/T in order to have a solvable set of linear equations, and for the data rate increase R>1 applications where M>N the full rank of rank (H'•H) is a necessary condition for a unique solution for the estimate $\hat{X}$ of X as a linear equation in the Y where H' is the conjugate transpose of H.

Diversity applications of MIMO use space-time coding techniques to encode the Tx data X and spread the data over the available links and over T>1 epochs with the space-time code matrix C. This is considered to be a fundamental requirement for MIMO systems in order to provide improved performance in fading, provide less susceptibility to interference, and provide lower data packet dropout rates. Conventional dispersive delay-line receivers use weighted taps against multipath which creates dispersive and frequency selective channels. Current research includes the development of super-orthogonal space-time codes wherein "super-orthogonality" refers to the use of set partitioning of the data bits which are mapped by differential phase shift keying (DPSK), phase shift keying (PSK), quadrature amplitude modulation (QAM), Gaussian minimum shift keying (GMSK), or other modulation onto the amplitude and complex plane of each symbol, and the development of various properties and design algorithms for space-time codes for MIMO applications. Listed patents relate to MIMO technologies and applications and listed IEEE technical papers and press books compile the vast amount of research on space-time coding for both block codes and trellis codes and for equalization with emphasis on turbo coding techniques for MIMO applications. The current work on algorithms for solving the MIMO system equation $Y=H \circ X+N_o$ for $\hat{X}$ includes the "Special Issue on MIMO Wireless Communications", IEEE Trans. on Signal Processing, November 2003, Vol. 51, No. 11, the "Special Issue on Space-Time Transmission, Reception, Coding and Signal Processing", IEEE Trans. on Info. Theory, October 2003, Vol. 49, No. 10, the "MIMO Systems and Applications, Part I", the IEEE Journal on Selected Areas in Communications, April 2003, Vol. 21, No. 3, and listed papers and articles. Estimates $\hat{X}$ of X include direct inversion, maximum likelihood (ML), minimum mean square error (MMSE), and various iterative algorithms that trade off reduced computational complexity with some loss of accuracy. The best solution is generally considered to be the ML unbiased minimum variance solution to the estimate $\hat{X}=\min\{\|Y-H \circ X\|^2\}$ which is the value of $\hat{X}$ that minimizes the square of the absolute value of the error $\delta X=Y-H \circ X$ in the estimate $\hat{X}=X+\delta X$, and when the space-time code is explicitly identified this estimate is $\hat{X}=\min\{\|Y-H \bullet C\|^2\}$. Current practice does not explicitly identify C in the formulation of the MIMO problem.

For diversity, several space-time codes and in particular space-time block codes have been developed with the goal of providing relatively simple implementations of the optimal ML decoder for a few number of antennas. One group of such schemes concatenates this space-time code with an outer trellis coded modulation (TCM) code. This allows the combined space-time and TCM codes to use classic set partitioning techniques to partition signals within each block code subset and this supports a simple decision rule that restricts the transition branches leaving from or arriving to each state to be labeled by code words from the same block code subset.

For data rate increase, the use of spatial multiplexing as a form of space-time block coding transmits individual streams of data with each stream assigned to a different Tx antenna, after each data stream has been encoded and interleaved. With this V-BLAST scheme "V-BLAST: An architecture for realizing very high data rates over the rich-scattering wireless channel" by Wolniansky et. al. in Proc. URSI Int. Symp. Signals, Systems, Electronics, Pisa, Italy, September-October 1998 pp. 295-300, there is no spreading of the data over each of the antennas as in the diversity schemes, although there may be some mixing of the data over the different Tx antennas in a variation of V-BLAST. In general for data rate increase the receiver must de-multiplex the received channel signals and recover estimates of the transmitted signal in one of several possible ways. Zero-forcing techniques use a straight matrix inversion and can give degraded results when H is ill-conditioned meaning that the H'○H for M<N has less than full rank, and/or the ratio of maximum to minimum eigenvalues of H'○H is too large, and/or the determinant det (H'○H) of H'○H is too small. A MMSE receiver may be of help for this situation. On the other hand, the optimum detection and turbo decoding method used in the receiver is ML which compares all possible combinations of input data symbols which could have been transmitted, with the observed symbols in executing the estimate $\hat{X}=\min\{\|Y-H \bullet C\|^2\}=\min\{\|Y-H \bullet X\|^2\}$). Complexity of this decoding is high when many antennas or high-order modulations are used. Enhanced variants of this decoding have been proposed recently. The original BLAST scheme "Wireless communications system having a space-time architecture employing multi-element antennas at both the transmitter and receiver", U.S. Pat. No. 6,317,466 Nov. 13, 2001, Foschini and Golden, Lucent Technologies Inc. and variations thereof have received considerable attention. With BLAST the decoding strategy proposed is nulling and canceling which gives a reasonable tradeoff between complexity and performance. The matrix inversion process in nulling and canceling is performed in layers where one estimates a column from H, subtracts the symbol estimates from Y, and continues the decoding successively. A lien on this algorithm is the residual noise from each iteration which introduces a noise floor on decoding performance.

Critical to these algorithms for both diversity and data rate increase, is the accurate measurements of channel transmission coefficients which measure the fading and scintillation path loss, the Rayleigh flat fade and the Rician K-factor distribution modeling of this path loss, shadowing, doppler and delay spread profiles, joint correlations between the Tx antennas and between the Rx antennas, and the channel matrix H singular value (eigenvalue) distributions.

SUMMARY OF THE INVENTION

This invention provides a method for constructing novel architectures for MIMO systems that combines CDMA (including MC-CDMA and other variations), OFDMA, OWDMA with current waveforms and multi-resolution Wavelet waveforms with Walsh, Hybrid Walsh, generalized Hybrid Walsh orthogonal and quasi-orthogonal codes, and with novel space-time codes that generalize the current space-time codes into a substantially larger class of space-time codes ($C_0$) with improved performance and with a generalization ($H_0$) of the transmission matrix (H) that provides efficient maximum likelihood (ML) solutions for all combinations of the MIMO parameters. These architectures spread the users uniformly over the transmission paths to provide improved bit error rate performance. A novel class of space-time transmission matrices $H_0$, linear operators L, and space-time codes $C_0$ is constructed to enable the MIMO equation to be written $Y=H_0 \circ C_0 \circ X+N_o$ which factors out the input signal symbol set X and allows a direct ML calculation of the estimate $\hat{X}$ of X. The $H_0$, $C_0$ are constructed to guarantee the solution for $\hat{X}$ when this information exists in the transmission coefficients of H, to guarantee that they include the class of current space-time codes C and to provide a capability for optimum ML performance with reasonable complexities.

BRIEF DESCRIPTION OF THE DRAWINGS AND THE PERFORMANCE DATA

The above mentioned and other features, objects, design algorithms, and performance advantages of the present invention will become more apparent from the detailed description set forth below when taken in conjunction with the drawings and performance data wherein like reference characters and numerals denote like elements, and in which.

FIG. 3A defines space-time code elements for diversity L=2, rate R=1, and T=2 Scenario 1A.

FIG. 3B defines the MIMO equations and Alamouti's space-time code formulation.

FIG. 3C defines the solution of the MIMO equations and orthogonality properties of Alamouti's space-time codes and the space-time codes of this invention disclosure.

FIG. 4A defines some of the space-time code elements for the diversity L=3, rate R=1, and T=3 Scenario 1A.

FIG. 4B completes the definition of the space-time code elements.

FIG. 4C defines the MIMO equation.

FIG. 4D defines the solution of the MIMO equations and the orthogonality properties of the space-time codes.

FIG. 5A defines some of the space-time code elements for the diversity L=2, rate R=2, and T=2 Scenario 2.

FIG. 5B completes the definition of the space-time code elements and defines the MIMO equation.

FIG. 5C defines the solution of the MIMO equations and the orthogonality property of the space-time code.

FIG. 6A defines the space-time code elements for the diversity L=2, rate R=4, and T=1 Scenario 3.

FIG. 6B defines the MIMO equation and the solution to this MIMO equation and the orthogonality property of the space-time code.

FIG. 7A defines the space-time code elements for the diversity L=1, rate R=8, T=1 Scenario 4.

FIG. 7B defines the MIMO equation and the solution to this MIMO equation and the orthogonality property of the space-time code.

FIG. 8 summarizes the maximum-likelihood (ML) solutions to MIMO for Scenarios 1,2,3,4.

Figure 1:
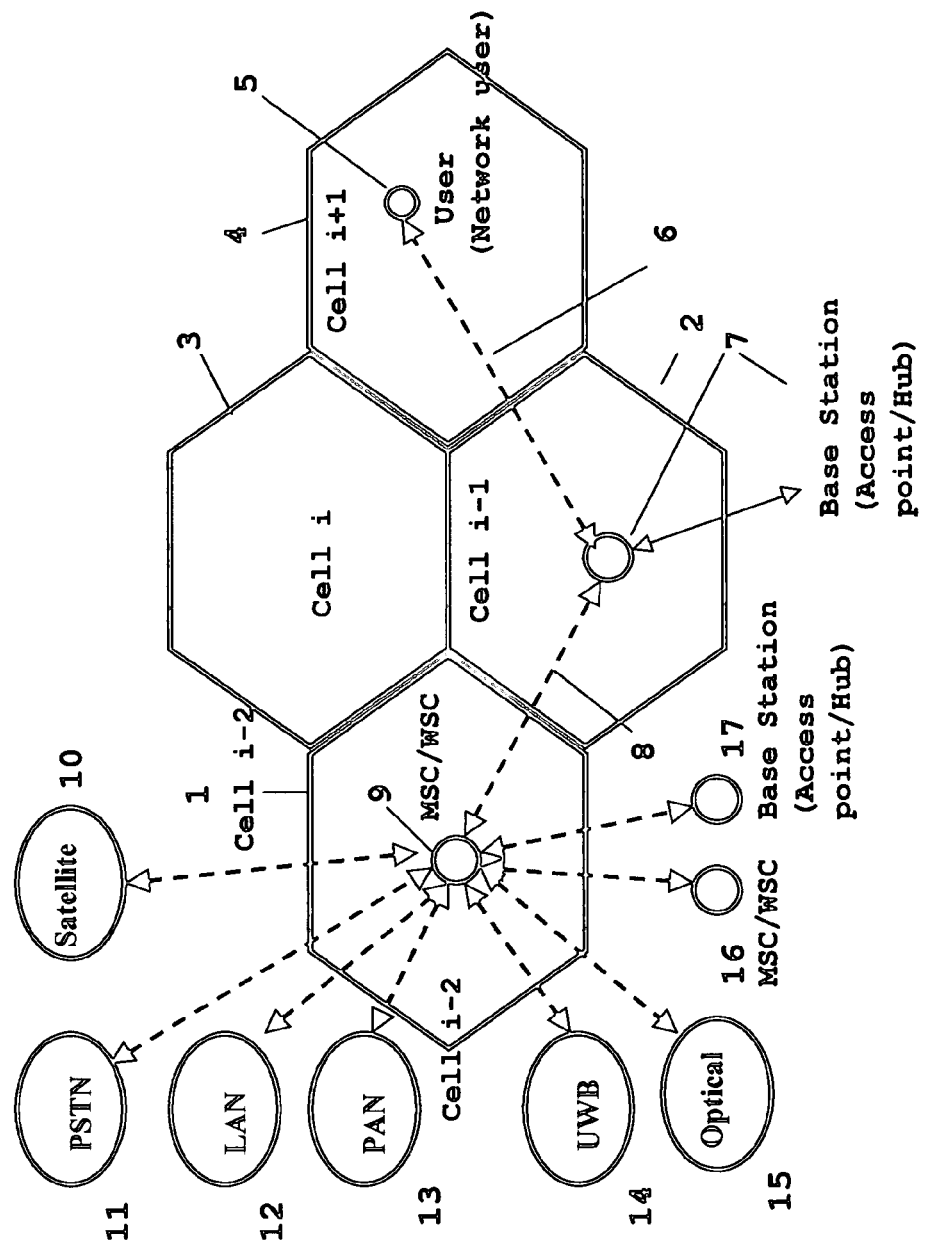
FIG. 1 is a schematic CDMA cellular network with the communications link between a base station and one of the multiple users.
Figure 9:
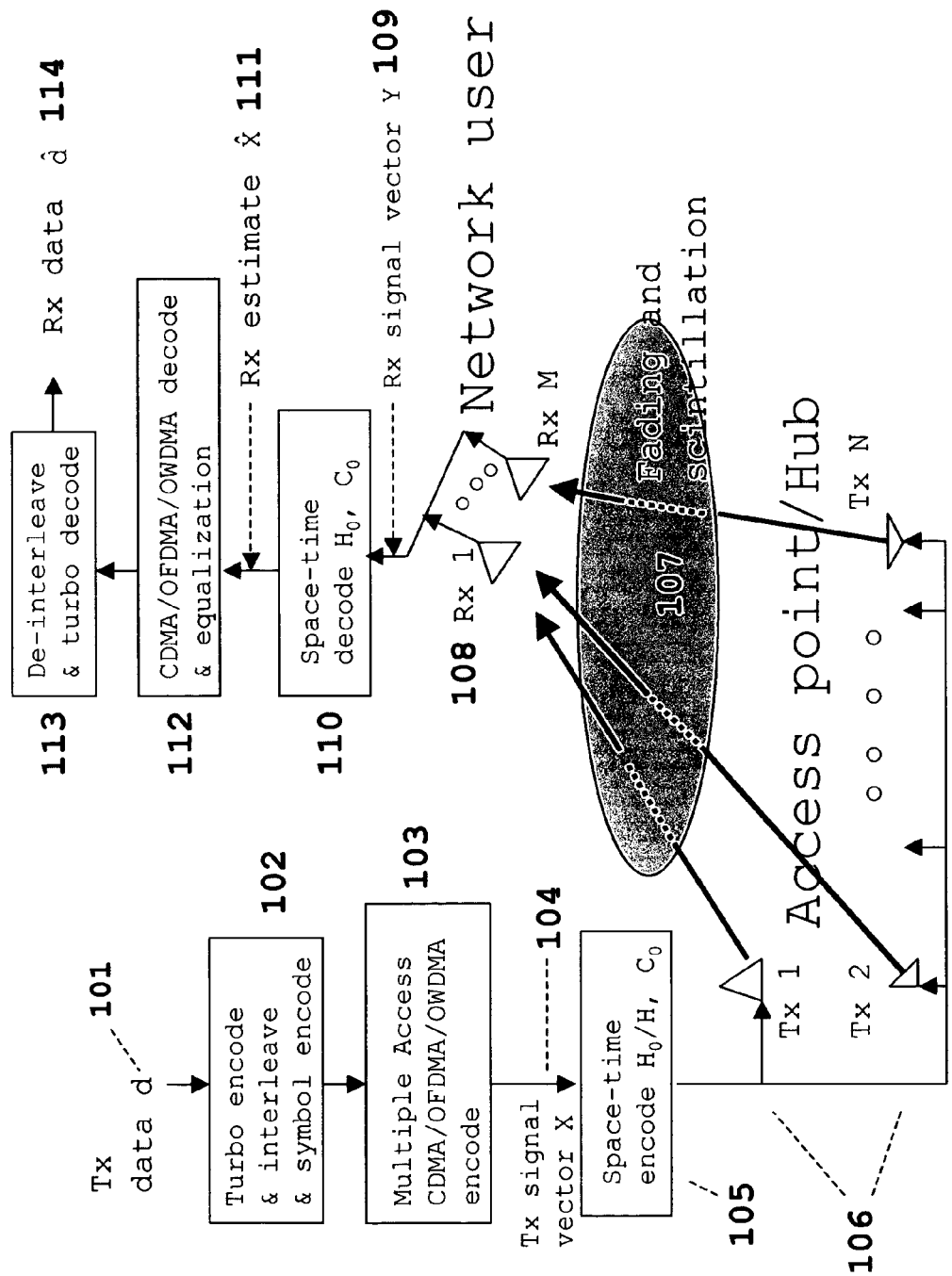

FIG. 9 is a representative architecture of this invention disclosure for MIMO systems for application to the communications link in FIG. 1.

Figure 10:
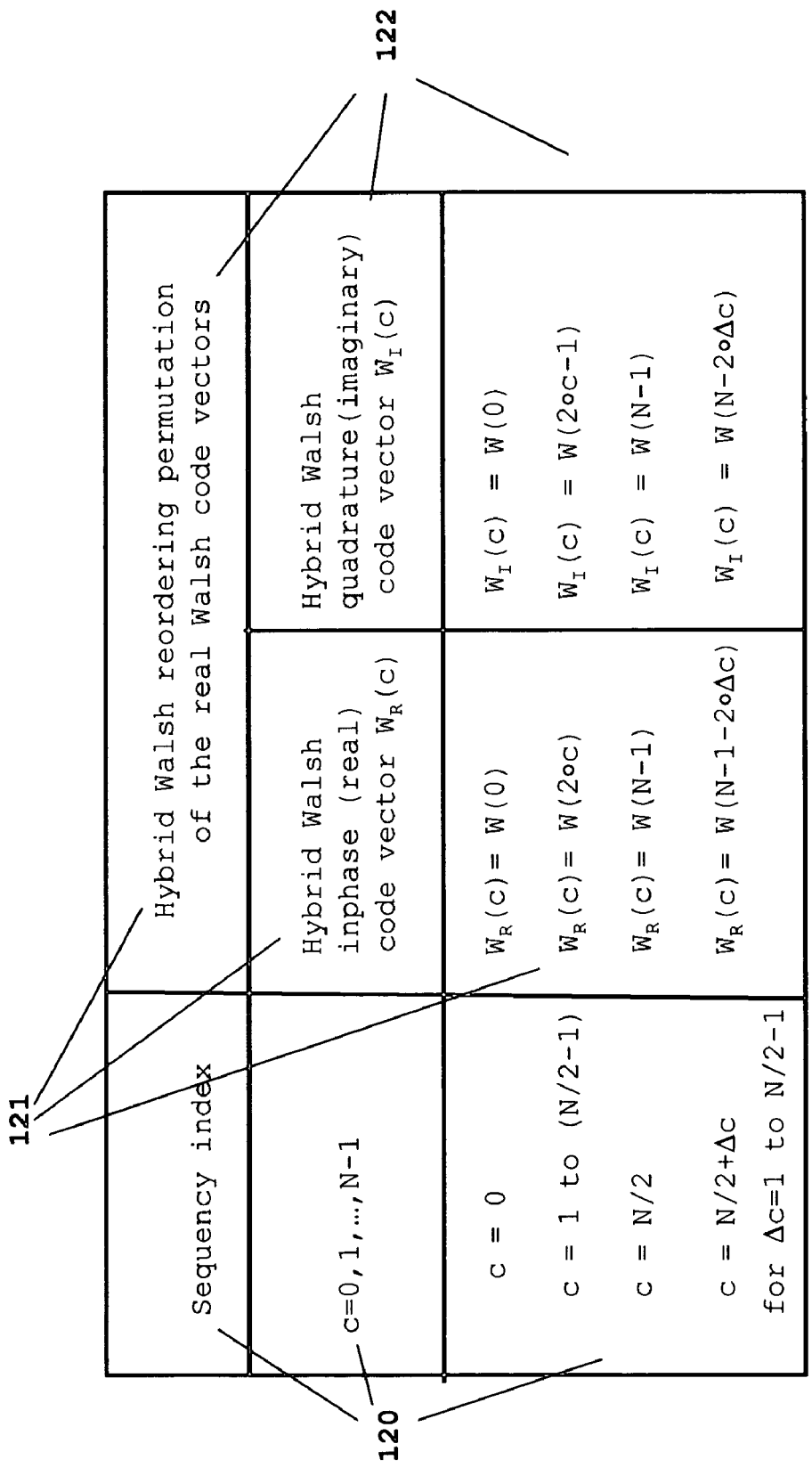

FIG. 10 defines the implementation algorithm of this invention disclosure for generating Hybrid Walsh codes from real Walsh.

Figure 11:
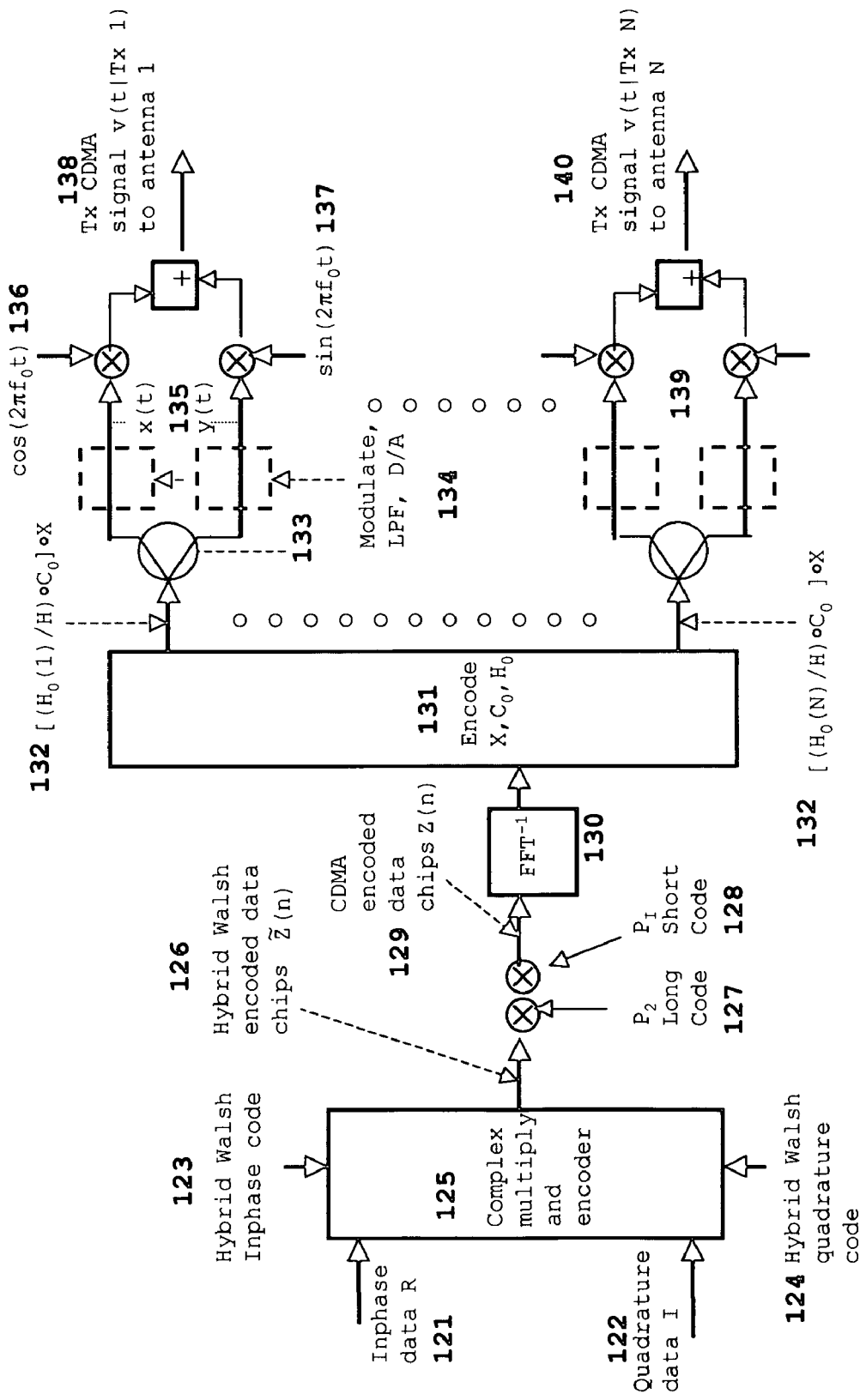

FIG. 11 depicts a representative MIMO Tx implementation for CDMA for this invention disclosure.

Figure 12:
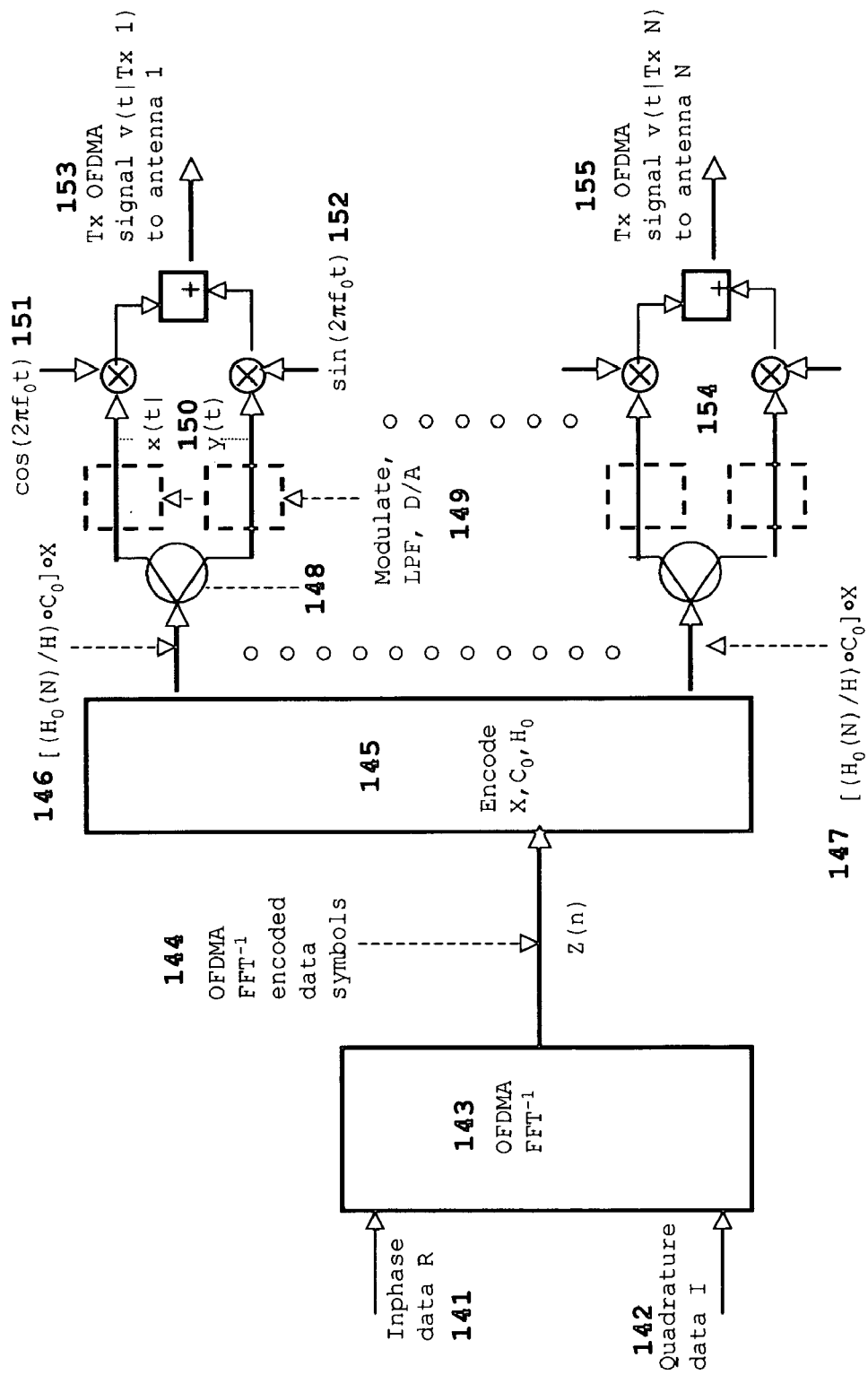

FIG. 12 depicts a representative MIMO Tx implementation for OFMA for this invention disclosure.

Figure 13:
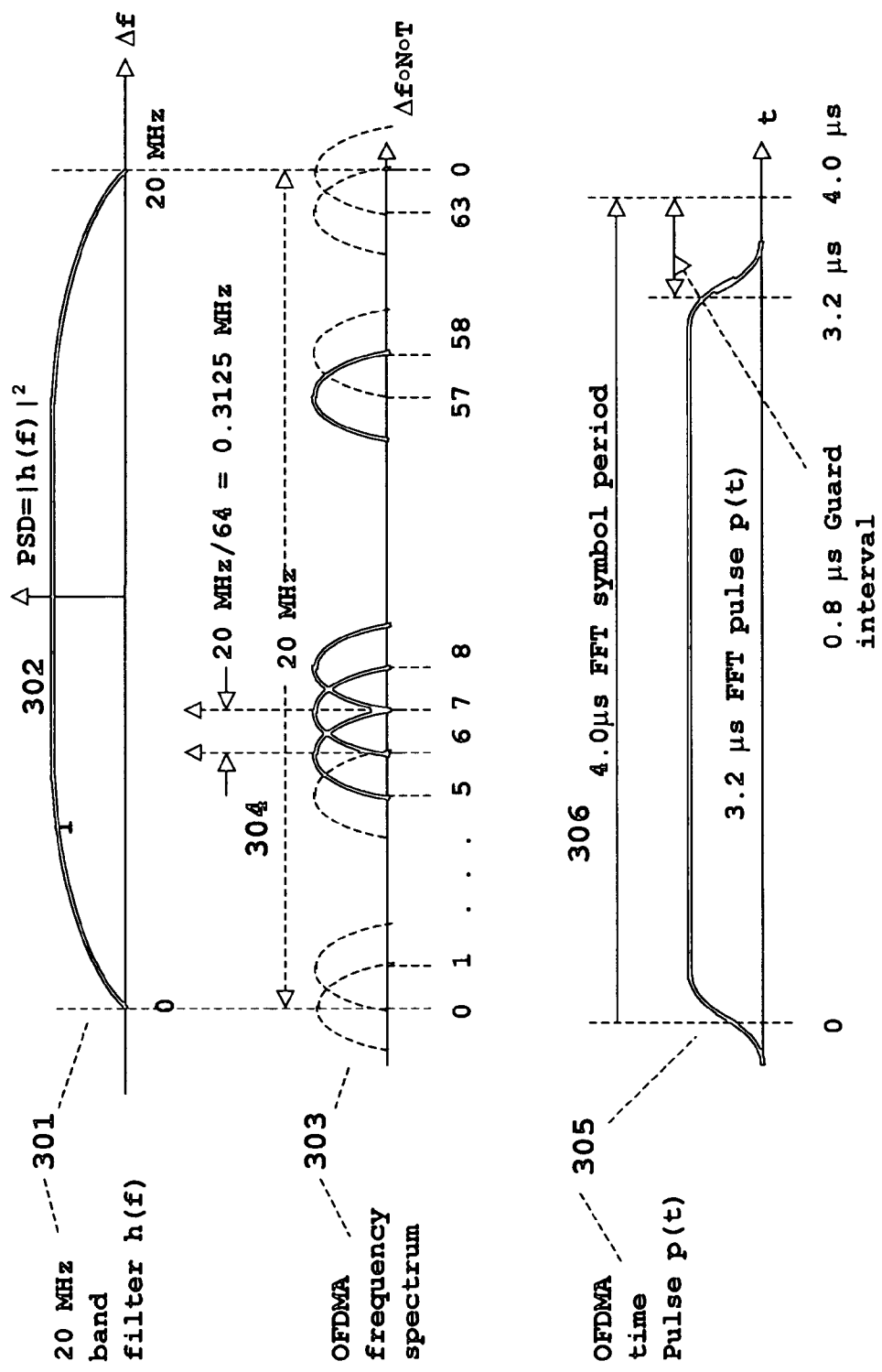

FIG. 13 depicts a representative OFDMA waveform for IEEE 802.11g

Figure 14:
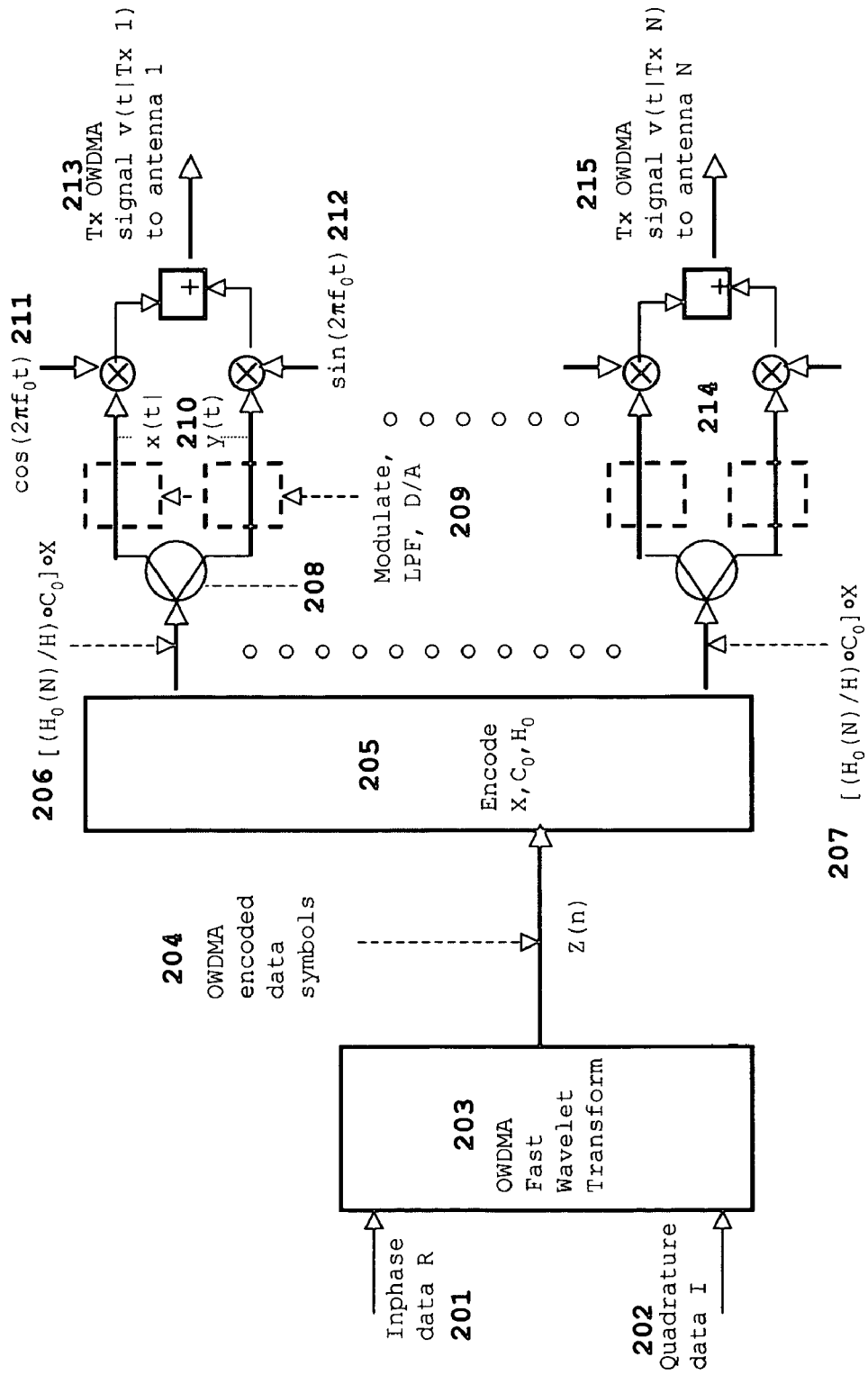

FIG. 14 depicts a representative MIMO Tx implementation for OWDMA for this invention disclosure.

Figure 15:
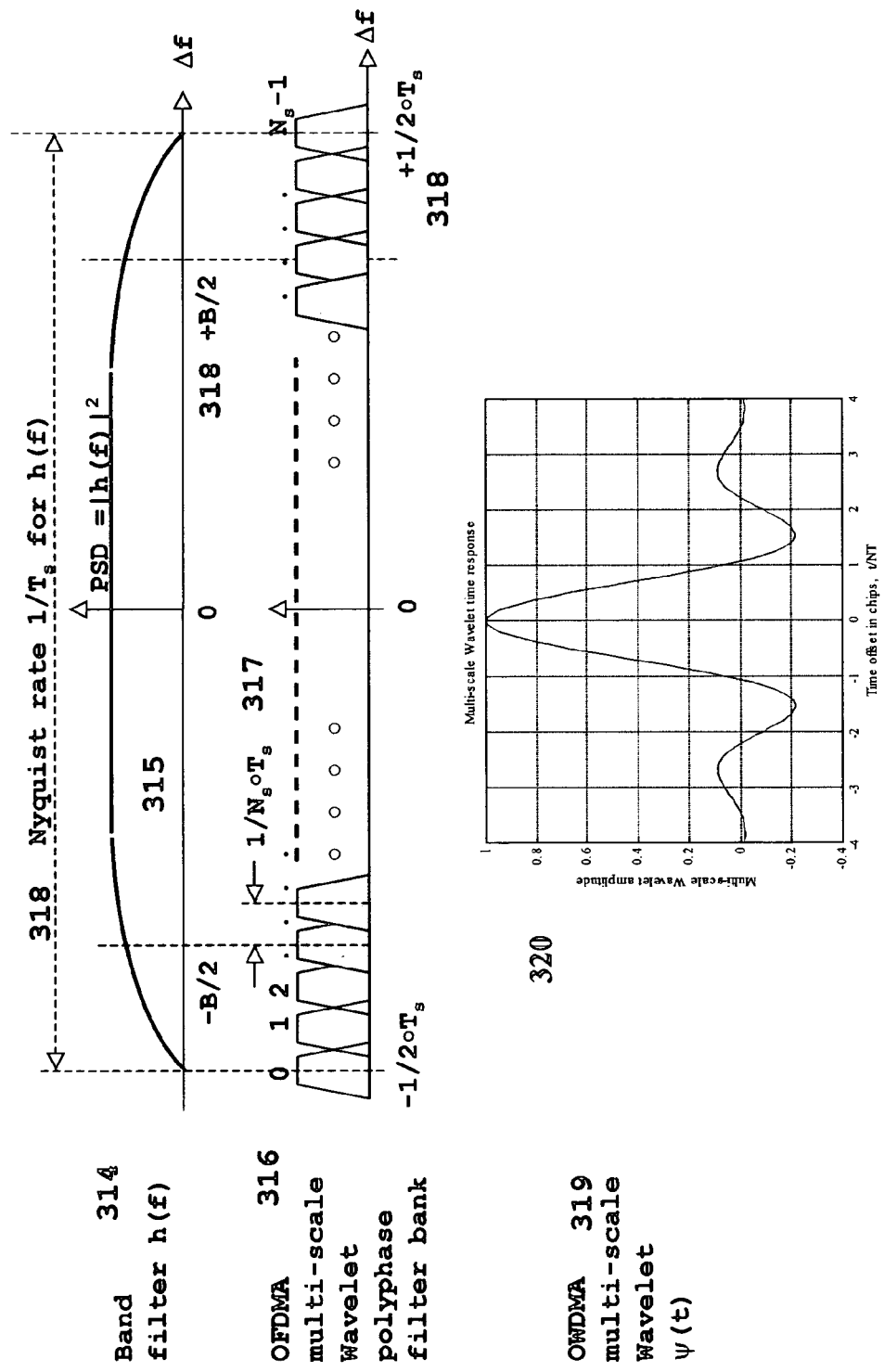

FIG. 15 depicts a representative OWDMA waveform

Figure 16:
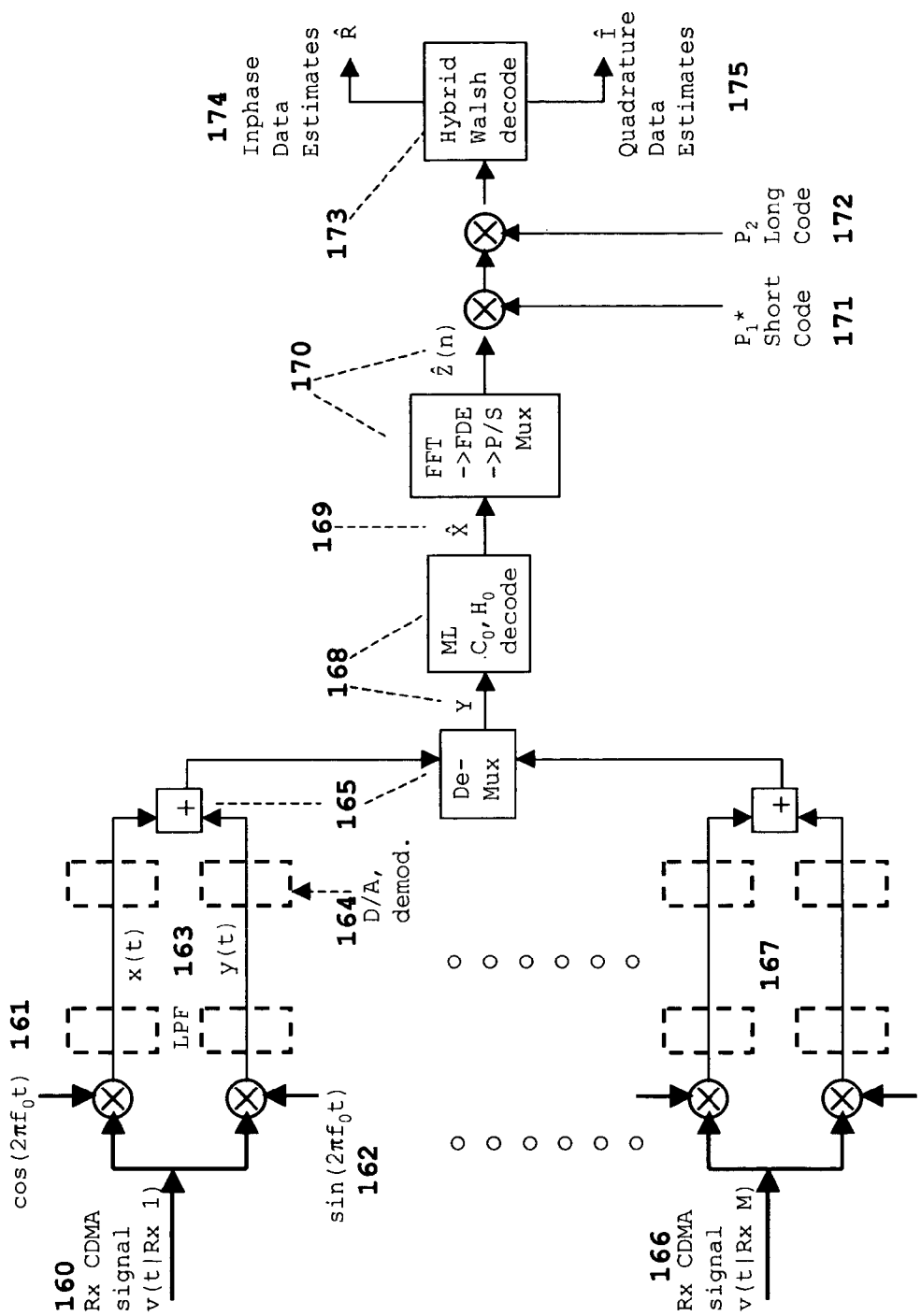

FIG. 16 depicts a representative MIMO Rx implementation for CDMA for this invention disclosure.

Figure 17:
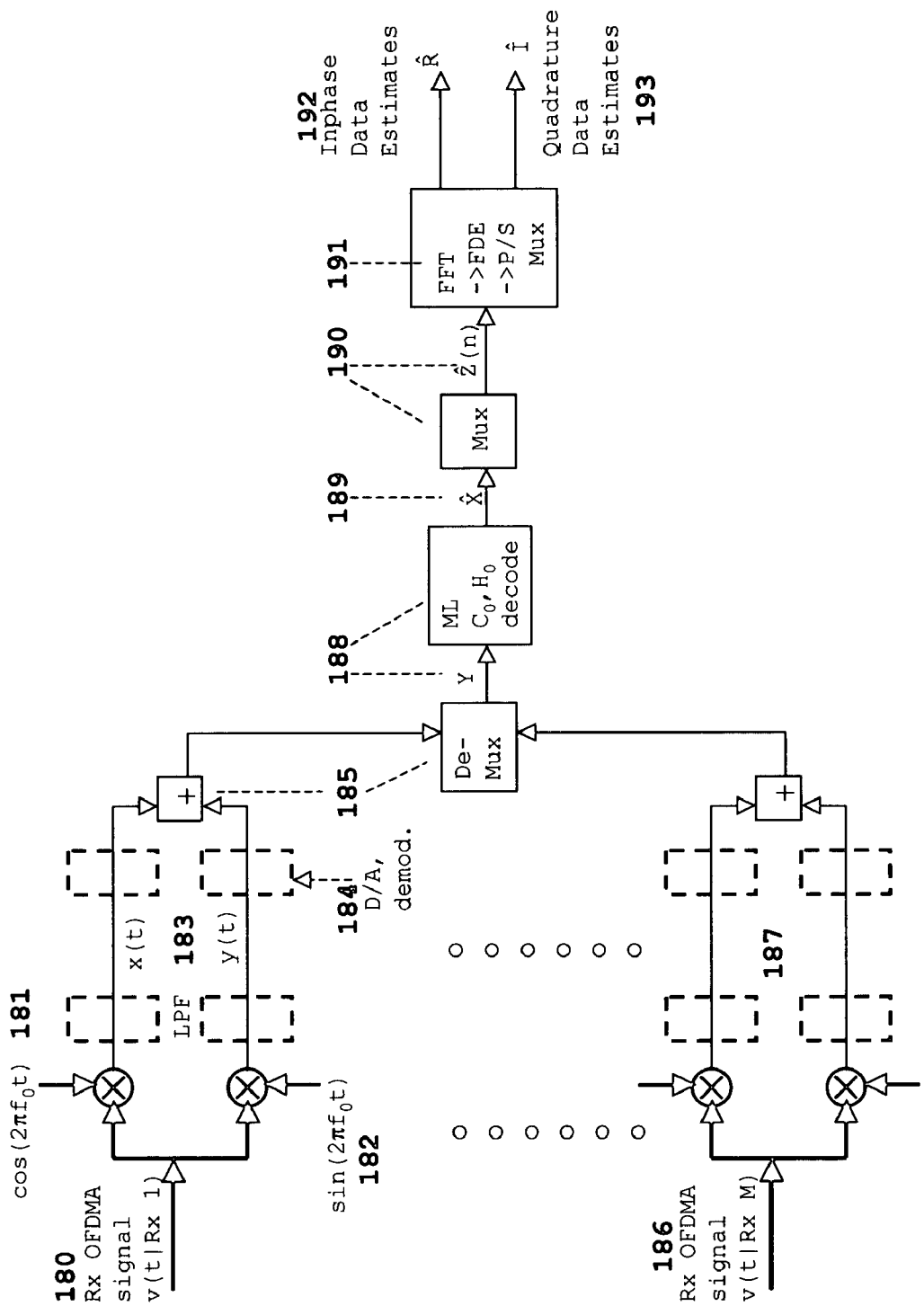

FIG. 17 depicts a representative MIMO Tx implementation for OFMA for this invention disclosure.

Figure 18:
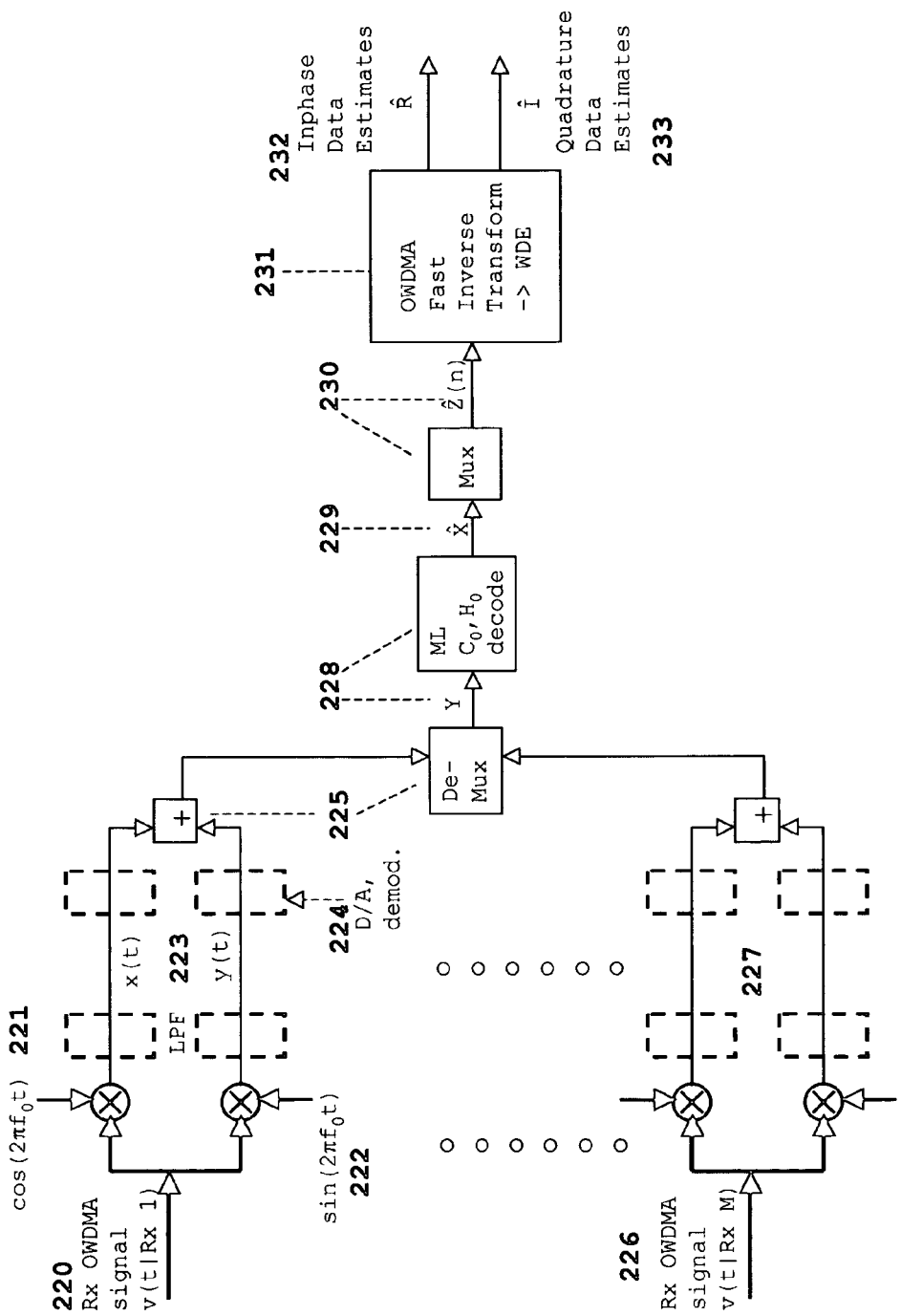

FIG. 18 depicts a representative MIMO Tx implementation for OWDMA for this invention disclosure.

DISCLOSURE OF THE INVENTION

Jensen's inequality from "Mathematical Statistics" by Furgeson, Academic Press, 1967 is a fundamental lemma and when applied to MIMO proves that a uniform spreading of the Tx signals over the MIMO transmission path improves the bit error rate (BER) performance compared to the other schemes considered for MIMO and which schemes include averaging at the receiver, optimum power control of the Tx antennas, optimum data rate control over the separate links using the data rate options offered by the symbol modulations, options offered by the error correction code and code rate in order to maintain the same BER performance over the separate Tx-to-Rx links, and a variety of other schemes. Space-time codes in this patent are complex codes for diversity with maximum data rate R=1 in contrast to current space-time diversity complex codes which have a data rate R<1 except for a limited class of applications which includes N=2 Tx antennas. Space-time codes in this patent provide complete flexibility in the choice of M,N allowed by the relative data rate R, diversity N, parameters M,N, and the rank of H'∘H. in contrast to current space-time codes which are severely restricted in the choice of M,N and T. For data rate improvement R>1 applications this patent offers multi-scale orthogonal complex codes with the fundamental properties that the uniform spreading of the data over the spectrum is preserved in the MIMO transmission in order to maximize the BER performance.

1. Space-Time Transmission Matrices and Codes

Architecture for MIMO starts with the development of a space-time code which is the mapping of the data symbols onto the Tx-to-Rx MIMO paths. Current art for space-time codes started with the Alamouti code "A simple transmit diversity technique for wireless communications" IEEE J. Select Areas Commun. vol. 16 pp. 1451-1455 October 1998 which is the 2×2 space-time code C defined in 32 in FIG. 3B for diversity L=2 with rate R=1 using M=1 Rx antenna and N=2 Tx antennas over the time block T=2 epochs of the repeated input symbol vector X in 29. This C combines the code and the symbols $X_1, X_2$ and their conjugates $X_1^*, X_2^*$ in the matrix 32 which cannot be factored as product of a code matrix multiplied by X using current matrix techniques, and wherein "*" is the complex conjugation. The 2 Tx transmission links are defined by the transmission matrix $H=[h_1, h_2]$ 22 in FIG. 3A with the transmission coefficients $h_1, h_2$. The solution for the estimates $\hat{X}_1, \hat{X}_2$ of the Tx symbols $X_1, X_2$ is the set of linear equations in 33 in FIG. 3C. All current space-time codes including Alamouti's code have a scaled orthogonality property for C illustrated by 34 in FIG. 3C where the scaling parameter is a function of the components (coordinates) of the data input vector X.

This invention disclosure defines the space-time code matrix $C_0$ and the transmission matrix $H_0$ as well as the linear operator L. These innovations enable the MIMO equation to be written $Y=H_0 \circ C_0 \circ X + N_o$ which factors out X so that $C_0$ can be integrated into the multi-scale architecture disclosed in this invention and enable the transmission matrix and space-time code to be combined into the product $H_0 \circ C_0$ used to evaluate the estimate $\hat{X}$ of X. Current space-time codes do not support this factorization and current practice uses the MIMO equation $Y=H \circ X + N_o$ with the understanding that the components of both X and the conjugate $X^*$ are embedded in the space-time code C which means one is actually solving the MIMO equation $Y=H \circ C + N_o$ for the estimate $\hat{X}$ of X. Complex conjugation is incorporated into the $C_0$ matrix elements as the linear complex conjugate operator L defined by the property that for vector X and components $X_1, X_2$ the L is defined by the linear equations $L[X]=X^*$, $L[X_1]=X_1^*$, $L[X_2]=X_2^*$. These innovations $H_0, C_0, L$ together with the algorithms disclosed for their construction provide a method for implementing a MIMO equation $Y=H_0 \bullet C_0 \bullet X + N_o$ that is identical to the space-time MIMO equation $Y=H \bullet C + N_o$ for each of the current and future space-time codes, provide a larger group of space-time codes, and provide improved space-time codes.

Scenario 1A in 21 in FIG. 3A consisting of M=1 Rx antenna, N=2 Tx antennas, diversity L=2, rate R=1, over T=2 time epochs, defines a method for implementing and finding a ML solution to the MINO equation $Y=H_0 \circ C_0 \circ X + N_o$ for the Alamouti application. A first step is the construction of a space-time transmission matrix $H_0$ 22 over the two time epochs T=1,2 using the transmission matrix H=[h1 h2] for each time epoch. The space-time code $C_0$ 23 of this invention disclosure is the product of the matrix A 24 composed of the sub-matrices $A_1, A_2$ 25 and the matrix B 26 composed of the sub-matrices $B_1, B_2$ 27. The $A_1, A_2$ are diagonal matrices with +/−1 elements and are constructed to provide appropriate sign changes to the row elements of $H_0$ to guarantee the determinant $det(H_0 \circ C_0)$ is not zero for $h_1, h_2 \neq 0$ and to conform to the Alamouti space-time code. The $B_1, B_2$ are permutated diagonal matrices with elements equal to 1 or L and are constructed to ensure that each input data symbol is assigned to a different antenna over the T=2 time epochs and to conform to the Alamouti space-time code with the proper complex conjugation. In FIG. 3B the MIMO equation for Y is written in the format of this invention disclosure in 28 with the input X and output Y defined in 29 and is expanded in 30 as a function of the components of X. This equation is rewritten as a function of the current space-time code C in 31 with C defined in 32. In FIG. 3C the ML solution for $\hat{X}$ is given in 33 and the orthogonality for $C, C_0$ is given in 34,35 respectively where the identity $L \circ L=1$ for the linear operator L is used in the evaluation in 35.

Scenario 1B in 41 in FIG. 4A consisting of M=1 Rx antenna, N=3 Tx antennas, diversity L=3, rate R=1, over T=3 time epochs, defines a method for implementing and finding a ML solution to the MINO equation $Y=H_0 \cdot C_0 \circ X+N_o$. Extending the method of construction in scenario 1A yields the $H_0$ in 42, the $C_0 = A \cdot B$ in 43,47 with matrix factors A,B defined in 44,45,46. The MIMO equation 48 has the ML solution for $\hat{X}$ in 49 and in a simplified form with the linear operator L removed the solution reduces to 50. Space-time orthogonality for both of these $C_0$ is defined in 51. As in the previous the $H_0, C_0$ are constructed to ensure that det $(H_0 \circ C_0) \neq 0$ for $h_1, h_2, h_3 \neq 0$ which is the requirement for the solution X and to ensure that each input data symbol is assigned to a different antenna over the T=3 time epochs. The requirement $det(H_0 \circ C_0) \neq 0$ assumes that the determinant is taken with L=1 and further observes that from the construction of the matrices A,B, in the decomposition of $H_0 \circ C_0 = H_1 + H_2 \circ L$ in 48 both the $H_1$ and $H_2$ are invertible when det $(H_0 \circ C_0) \neq 0$ to support the ML solution for $\hat{X}$ in 49.

Scenario 2 in 61 in FIG. 5A consisting of M=4 Rx antennas, N=4 Tx antennas, diversity L=2, rate R=2, over T=2 time epochs, defines a method for implementing and finding a ML solution to the MINO equation $Y=H_0 \circ C_0 \circ X+N_o$. The method of construction in scenario 1 yields the $H_0$ in 62 and $C_0$ in 63 with the matrix factor A equal to the identity since $det(H) \neq 0$ and with the matrix factor B defined in 64. The MIMO equation 65 in FIG. 5B has the ML solution $\hat{X}$ in 66 in FIG. 5C which requires $det(H) \neq 0$. Orthogonality for $C_0$ is given in 67. From the method for construction of the $H_0$ in 62 it follows that $det(H) \neq 0$ implies that $det(H_0) \neq 0$ which is written as the equation $det(H) \neq 0 \Rightarrow det(H_0) \neq 0$ in 66.

Scenario 3 in 71 in FIG. 6A consisting of M=8 Rx antennas, N=4 Tx antennas, diversity L=2, rate R=4, over T=1 time epoch, defines a method for implementing and finding a ML solution to the MINO equation $Y=H_0 \cdot C_0 \cdot X+N_o$. The method of construction in scenarios 1,2 is modified to define the $H_0=H$ in 72 and the $C_0$ in 73 as the matrix of column vectors from the Hybrid Walsh complex orthogonal code matrix from patent application Ser. No. 09/826,118 filed in Jan. 9, 2001. The MIMO equation 74 in FIG. 6B has the ML solution $\hat{X}$ in 75 which requires $det(H'H) \neq 0$ and the $C_0$ orthogonality is given in 76.

Scenario 4 in 61 in FIG. 7A consisting of M=8 Rx antennas, N=8 Tx antennas, diversity L=1, rate R=8, over T=1 time epoch, defines a method for implementing and finding a ML solution to the MINO equation $Y=H_0 \circ C_0 \circ X+N_o$. The method of construction in scenarios 3 yields the $H_0=H$ defined in 82 and the $C_0$ in 83 as the matrix of column vectors from the Hybrid Walsh complex orthogonal code matrix. The MIMO equation 84 in FIG. 7B has the ML solution $\hat{X}$ in 85 which requires $det(H) \neq 0$ and the $C_0$ orthogonality is given in 66

FIG. 8 summarizes the solutions for the MIMO equation of this invention disclosure for the scenarios 1,2,3,4 which are classified according to the relative values of M,N, diversity L, rate increase R, epochs T over which each input data symbol is spread, and references the example figures used to illustrate the method for construction and ML solution for each scenario. Solutions include the requirements on the $H_0$ and $C_0$, the functional format of the Tx transmission matrix $H_0$, and the ML equation for the estimate $\hat{X}$. Listed under scenarios are the scenario number, relative values for M and N, diversity L, rate R, epoch T, and figure number for the example scenario.

In FIG. 8 scenario 1 for M<N and scenario 2 for M=N both require T>1 and have the respective data rates R=1,R>1 with the same solution requirements on $H_0$ and $C_0$, use the same method for constructing the space-time transmission matrix $H_0$ as a diagonal matrix $\Lambda$ with the matrix elements equal to the transmission matrix H along the diagonal $H_0 = \Lambda(H)$ as illustrated by the construction of $H_0$ in 22 in FIG. 3A and in 42 in FIG. 4A, have the same method of construction for the orthogonal $C_0$, and have the same ML solution for $\hat{X}$ which is given in the table in the simplified form when L is absent and is given in the note below the table in the general form with L present using equation 49 in FIG. 4D.

In FIG. 8 for the combined diversity and rate increase scenario 3 with M>N and T=1 the solution requirements on $H_0$ and $C_0$ are the requirement that $det(H_0' \circ H_0) \neq 0$ and the orthogonality of $C_0$. the space-time transmission matrix reduces to the transmission matrix $H_0=H$, the $C_0$ is constructed with orthogonal CDMA coding vectors from the Hybrid Walsh as illustrated in 73 in FIG. 6A or Walsh or generalized Hybrid Walsh orthogonal channelization codes, and the ML solution for $\hat{X}$ has the format considered in the MIMO literature when the $C_0$ is reduced to the identity. The rate increase scenario 4 for M=N has the solution requirement $det(H_0) \neq 0$ for the square matrix $H_0=H$ and the orthogonality of $C_0$, the $C_0$ is constructed with orthogonal CDMA coding vectors from the Hybrid Walsh as illustrated in 83 in FIG. 7A or Walsh or generalized Hybrid Walsh orthogonal channelization codes, and the ML solution is given in the table.

FIG. 8 ML solutions for $\hat{X}$ maximizes the likelihood function f(Y|X) defined by the conditional Gaussian probability density function for the MIMO equation $Y=H_0 \cdot C_0 \cdot X+N_o$. The equation for f(Y|X) is well known "Turbo coding, turbo equalization, and space-time coding" by Hanzo et. al. IEEE Press, John Wiley & Sons, 2002, and defined to be $$f(Y \mid X) = \text{ probability of } Y \text{ given} \qquad (1)$$
$$X = [(2\pi)^M \det(Q)]^{-1/2} \exp[-(Y - H_0 \cdot C_0 \cdot X)]$$
$$\text{where } Q = \text{covariance of noise } N_o$$
$$= E[N_o \cdot N_o']$$
$$= 2 \cdot \sigma^2 \cdot I \text{ for } AWGN \text{ noise}$$

where $E[(o)]$ is the expected value of (o) and the noise covariance Q is reduced to $Q=2\circ\sigma^2\circ I$ under the assumption that the noise $N_o$ is an additive white Gaussian noise (AWGN) zero-mean stationary noise process and where I is the N×N identify matrix, and $2\circ\sigma^2$ is the 2-sigma value of noise. For $Q=2\circ\sigma^2\circ I$ the solutions for the value $\hat{X}$ of X which maximizes $f(Y|X)$ are Scenarios 1, 2: When $L$ is absent, since $[H_0 \cdot C_0]$ is a square matrix the $ML$ solution $\hat{X}$ that maximizes $f(Y|X)$ is $$\hat{X} = [(H_0 \cdot C_0)' \cdot (H_0 \cdot C_0)]^{-1} \cdot (H_0 \cdot C_0)' \cdot Y$$
$$= (H_0 \cdot C_0)^{-1} \cdot Y$$

(2)

Scenarios 1,2: With L, since $[H_0 \bullet C_0]$ is a square matrix the ML solution $\hat{X}$ that maximizes $f(Y|X)$ is $$\hat{X} = (H_0 \cdot C_0)^{-1} \cdot Y$$
$$= [H_2^{-1} \cdot H_1 - H_1^{*-1} \cdot H_2^*]^{-1} \cdot [H_2^{-1} - H_1^{*-1} \cdot L] \cdot Y$$

Scenario 3: Since $[H_0'\bullet H_0], C_0$ are square matrices the ML solution $\hat{X}$ that maximizes $f(Y|X)$ is
$\hat{X}=N^{-1}\circ C_0'\circ[H_0'\circ H_0]^{-1}\bullet H_0'\bullet Y$
Scenario 4: Since $H_0$, $C_0$ are square matrices the ML solution $\hat{X}$ that maximizes $f(Y|X)$ is $$\hat{X} = N^{-1} \cdot C_0' \cdot [H_0' \cdot H_0]^{-1} \cdot H_0' \cdot Y$$
$$= N^{-1} \cdot C_0' \cdot H_0^{-1} \cdot Y'$$

which are the ML solutions listed in FIG. 8 and derived in the previous for scenarios 1,2,3,4. The AWGN noise assumption is generally applicable for MIMO communications and will be used in this invention disclosure. For scenarios 1,2 the solution $\hat{X}$ is defined for both L absent and L present in the construction of $C_0$.

Figure 2:
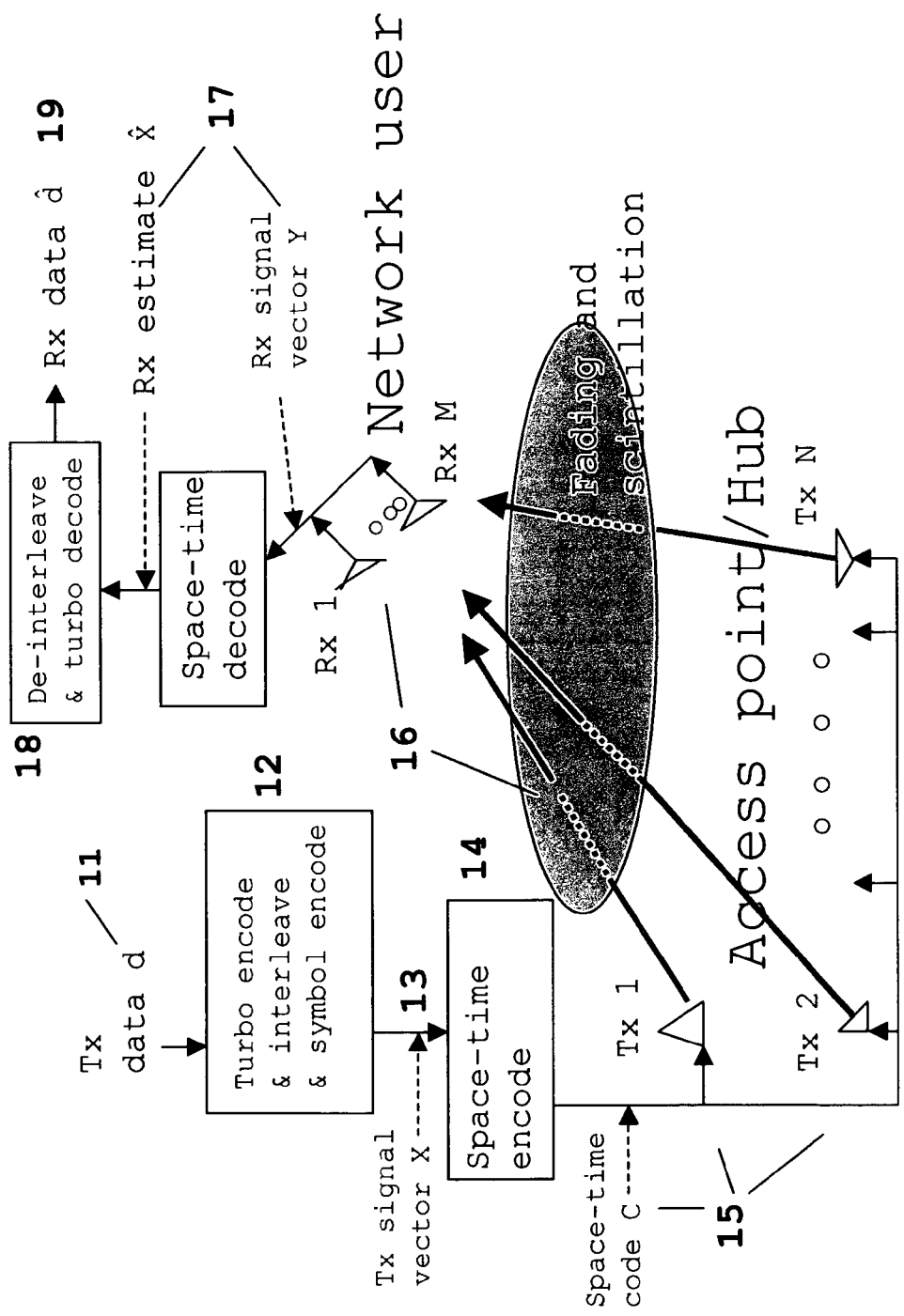
FIG. 2 is a representative architecture for current MIMO systems for application to the communications link in FIG. 1.

FIG. 9 depicts the MIMO scenario in FIG. 2 using the multiple access CDMA/OFDMA/OWDMA (CDMA or OFDMA or OFDMA) encoding and space-time coding $H_0$, $C_0$, L of this invention disclosure for the communications architecture consisting of N Tx antennas 106 communicating through a scintillated, dispersive, fading, and multipath links 107 to M Rx antennas 108 for the forward communications links for the cellular communications 6 from the access point or hub 7 to the network user 5 in FIG. 1. Transmission starts with the input Tx data d 101 which is encoded, interleaved, formatted, and symbol encoded 102 followed by the CDMA/OFDMA/OWDMA encoding 103 to generate the input signal (symbol) vector X 104 whose elements are the encoded data symbols from 103. This encoding includes the Tx signal processing required to support Rx signal processing equalization such as frequency domain equalization (FDE) and Wavelet domain equalization (WDE) to correct for scintillation, dispersion, fading, and multipath. Tx symbol vector X is space-time encoded 105 using $H_0/H, C_0, L$ where ($H_0/H$) is equal to $H_0$ with the elements of H removed since they are generated by the Tx-to-Rx communication links, and handed over to the Tx antenna subsystem which performs the digital-to-analog conversion, symbol waveform modulation, single-side-band upconversion, power amplification, and transmission by the antenna elements for each of the N Tx transmissions by the access point or hub. Rx signals received by the network user antennas are amplified, filtered, down-converted, detection filtered and analog-to-digital converted to recover the Rx symbol vector Y 109. Space-time decoding 110 defined in scenarios 1,2,3,4 is implemented to recover the ML estimates $\hat{X}$ 111 of X which are processed by the CDMA/OFDMA/OWDMA decoding and equalization 112 followed by deinterleaving and turbo decoding 113 to recover the ML estimates $\hat{d}$ 114 of the Tx data d 101.

2. Hybrid Walsh CDMA Codes

The Hybrid Walsh CDMA orthogonal codes are the natural extension of the real Walsh codes to the complex domain. These codes are in 1-to-1 correspondence with the discrete Fourier transform (DFT) in the N-dimensional complex code space $C^N$ space where the correspondence is between the real components of the Hybrid Walsh and DFT code vectors, is between the complex components of the Hybrid Walsh and DFT code vectors, and is between the sequency for the Hybrid Walsh and the frequency for the DFT where sequency is the average rate of rotation of the Hybrid Walsh code vector components. This 1-to-1 correspondence is uniquely specified by the lexicographic reordering permutations in FIG. 10 which are implemented as the address change of the row vectors W(c) of W to define the row vectors $W_R(c)$ of the real code components of $\tilde{W}(c)$ in lexicographic ordering with increasing sequency 120. Likewise, the imaginary (quadrature) reordering permutation 121 is defined as an address change of the row vectors in W to correspond to the row vectors $W_I(c)$ of the imaginary code components of $\tilde{W}(c)$ in lexicographic ordering with increasing sequency 122. These reordering permutations define the Hybrid Walsh code vectors $\tilde{W}(c)=W_R(c)+j\bullet W_I(c)$ and are the closest possible approximation to the DFT with orthogonal code vectors taking the values $\{1+j, -1+j, -1-j, 1-j\}$ or equivalently the values $\{1, j, -1, -j\}$ when the axes are rotated and renormalized where $j=\sqrt{-1}$ Example Hybrid codes are 73 in FIG. 6A for N=4 and 83 in FIG. 7A for N=8 wherein the axes are rotated and renormalized so that the codes take the values $\{1, j, -1, -j\}$.

An equivalent way to derive the complex Hybrid Walsh code vectors in $C^N$ from the real Walsh basis in $R^{2N}$ is to use a sampling technique which is a well known method for deriving a complex DFT basis in $C^N$ from a Fourier real basis in $R^{2N}$.

Real Walsh codes are Hadamard codes which are rearranged according to increasing sequency. The real Hadamard H(c,n) and real Walsh W(c,n) code c and chip n (component n) elements of the N×N code matrices whose 1×N code vectors H(c),W(c) are the rows of H,W respectively, are defined by the equations $$H(c,n)=(-1)^{\wedge}[c_0n_0\oplus c_0n_0\oplus \ldots \oplus c_{M-1}n_{M-1}]W(c,n)=$$
$$(-1)^{\wedge}[c_{M-1}n_0\oplus(c_{M-2}\oplus c_{M-1})n_1\oplus$$
$$(c_{M-3}\oplus c_{M-2})n_2\ldots\oplus(c_0\oplus c_1)n_{M-1}]$$

(3)

using the binary representations of $c=c_0+2c_1+\ldots+2^\wedge(M-1)c_{M-1}$ and $n=n_0+2n_1+\ldots+2^\wedge(M-1)n_{M-1}$ and where "$\oplus$" is the modulo-2 addition of the 0,1 binary coefficients $c_0, c_1, \ldots, c_{M-1}$ of c and binary coefficients $n_0, n_1, \ldots, n_{M-1}$ of n, and where $N=2^\wedge M$.

Generalized Hybrid Walsh orthogonal CDMA codes increase the choices for the code length by combining Walsh, Hybrid Walsh, DFT, and other orthogonal codes, and quasi-orthogonal code families including pseudo-noise (PN) codes, using tensor product construction, direct sum construction, and general functional combining. Generalized Hybrid Walsh orthogonal CDMA codes increase the flexibility in choosing the code lengths for multiple data rate users at the implementation cost of introducing multiply operations into the CDMA encoding and decoding or degrading the orthogonality property to quasi-orthogonality. Tensor product of two matrices A⊗B is the matrix constructed with the elements of A multiplying the matrix B so that the dimension of the tensor product is the product of the dimensions of A and B. Equation (4) lists examples of the tensor product construction of the generalized hybrid Walsh codes using the N×N DFT matrices EN and Hybrid Walsh matrices $\tilde{W}_N$ and also lists an example of functional combining with direct sums Tensor product examples (4)

$$8 \times 8 \quad C_8 = \tilde{W}_8$$
$$12 \times 12 \quad C_{12} = \tilde{W}_4 \otimes E_3$$
$$C_{12} = E_3 \otimes \tilde{W}_4$$
$$16 \times 16 \quad C_{16} = \tilde{W}_{16}$$
$$= \tilde{W}_4 \otimes \tilde{W}_4$$

Functional combining example $$C_N = f(A \oplus B, P)$$

wherein
A=$N_a \times N_a$ orthogonal code matrix
B=$N_b \times N_b$ orthogonal code matrix $$A \oplus B = \text{Direct sum of matrix } A \text{ and matrix } B$$
$$= (N_a + N_b) \times (N_a + N_b) \text{ orthogonal code matrix}$$
$$= \begin{bmatrix} A & O_{N_a \times N_b} \\ O_{N_b \times N_a} & B \end{bmatrix}$$

wherein f(A⊕B, P) is the functional combining operator of matrices A⊕B and P equal to the element-by-element covering of the elements of A⊕B by the elements of P when the elements of A⊕B≠0 and equal to the element-by-element sum of the elements of A⊕B and the elements of P when A⊕B=0, the matrix P is the N×N pseudo-orthogonal complex code matrix whose row code vectors are independent strips of PN codes for the real and imaginary components, and the matrices $O_{N_a \times N_b}$, $O_{N_b \times N_a}$ are the null matrices of size equal to $N_a \times N_b$, $N_b \times N_a$.

3. CDMA, OFDMA, OWDMA Space-Time Coding

Multiple access technique CDMA spreads the user symbols uniformly over the frequency spectrum throughout the length $N_s \cdot T_s$ of each code block where $T_s$ is the time interval between code symbols and $N_s$ is the number of code symbols in a code block. OFDMA assigns each user symbol to a DFT frequency harmonic over the DFT symbol length $N_s \cdot T_s$ where $T_s$ is the DFT sample interval and $N_s$ is the number of DFT harmonics, and the DFT block rate equal to the DFT channel symbol rate is $1/N_s \cdot T_s$ upon neglecting the required time intervals between the DFT blocks. OWDMA assigns each user to one of the $N_s$ multi-resolution Wavelet channels which are uniformly spread at $1/N_s \cdot T$ intervals over the frequency band $1/T_s$ and each channel Wavelet symbol repetition interval is $N_s \cdot T_s$. These CDMA,OFDMA,OWDMA multiple access techniques spread the signal uniformly over the $T_s$ second intervals of each data block $N_s \cdot T_s$.

Applications to 4G could use CDMA in the form of a multi-carrier CDMA (MC-CDMA) or CDMA with frequency domain equalization or other signal processing of CDMA to compensate for scintillation, dispersion, fading, and multipath in the MIMO communication links. For CDMA these techniques take the fast Fourier transform (FFT) of the Rx CDMA, perform frequency domain equalization (FDE) on the FFT outputs, and take the inverse fast Fourier transform (FFT$^{-1}$) to recover the equalized Rx CDMA signal. For the MC-CDMA version of CDMA ("Broadband CDMA Techniques", by Adachi et. al., pp. 8-18, IEEE Wireless Communications, April 2005, Vol. 12, No. 2) which is used in this invention disclosure an FFT$^{-1}$ on the CDMA signal converts each CDMA to a fourier transform harmonic for Tx transmission, performs a FFT on the received signal to recover the CDMA symbols, performs FDE on these CDMA symbols to remove the scintillation, dispersion, fading and multipath, and hands off the equalized CDMA symbols to the Rx CDMA decoder.

FIGS. 11-to-15 depict representative CDMA, OFDMA, OWDMA Tx space-time implementations for the cellular communications links 6 in FIG. 1. Equation (5) defines the multiple-access and space-time signal processing to support these implementations in the absence of equalization. The additional signal processing required for equalization is depicted in the Tx and Rx figures for the space-time implementations.

In FIG. 11 the Tx CDMA transmitter signal processing depicts a representative embodiment of the CDMA transmitter signal processing for the forward and reverse links 6 between the base station and the users that implements the CDMA encoding for the Hybrid Walsh for CDMA channelization, synchronization, tracking, and scrambling of the data for transmission by several antennas to implement MIMO. Depicted are the principal signal processing functions that are relevant to this invention disclosure. The Hybrid Walsh of this invention disclosure is an improvement to the real Walsh currently used for the forward CDMA link by CDMA2000 and W-CDMA. The added signal processing for MIMO depicts a representative implementation of the space-time codes of this invention disclosure with CDMA for MIMO. Data symbol inputs from the turbo encoding, interleaving, formatting, and symbol encoding in the transmitter in 102 in FIG. 9 are the inphase data symbols R 121 and quadrature data symbols I 122 which are the components of the complex symbol Z(u)=R+j∘I. The Hybrid Walsh inphase 123 and quadrature 124 codes defined in 120,121 and 120,122 in FIG. 10 are used to implement the Hybrid Walsh encoding 125 using the representative algorithm defined in 500 in equation (5) that spreads and channelizes the data symbols with rate R=$N_s$ codes to generate the encoded chip symbols $\tilde{Z}$(n) 126 which are scrambled by a long pseudo-noise (PN) code $P_1$(n) 127 followed by a short PN code $P_2$(n) 128 defined in 500 in equation (5). These PN codes are complex with values {1,j,−1,−j} similar to the Hybrid Walsh with values {1,j,−1,−j} and the multiply operations "⊗" in 127,128 can be implemented by sign changes and add arithmetic operations. The long PN code is a PN code sequence intended to provide separation of the cells and sectors and to provide protection against multipath. The separation between code segments in the shift register generation of the long PN codes is sufficient to make them statistically independent. These codes can be converted to complex codes $P_2$(n) by using the code for the real axis and a delayed version of the code for the quadrature axis. Different code segments are assigned to different cells or sectors to provide statistical independence between the communications links in different cells or sectors. Short PN codes are used for scrambling and synchronization of CDMA code chips from the Hybrid Walsh encoding of the data symbols after they are multiplied by a long code. These codes include real and complex valued segments of maximal-length shift register sequences and segments of complex Gold codes which range in length from 256 to 38,400 chips and also are used for user separation and sector separation within a cell. Short PN codes $P_1(n)$ also include Kasami sequences, Kerdock codes, and Golay sequences. Outputs are the CDMA encoded data chips $Z(n)$ in 129 which have been rate $R=1$ phase coded with both the long and short PN codes.

The CDMA encoded data symbols $Z(n)$ in block lengths are encoded by the $FFT^{-1}$ 130 onto frequency harmonics with each harmonic encoded with a CDMA symbol $Z(n)$. These encoded harmonics are summed into an output stream over each block length which is parsed 131 into contiguous equal strips of N symbols and each set of N symbols is an "epoch" for space-time processing and are the components of the input vector X which is space-time processed to generate the N row vectors $[(H_0(i)/H) \circ C_0] \circ X$ 132 of the space-time code $[(H_0/H) \circ C_0]$ for handover to the transmitter processing for the N Tx antennas. As defined in 501 in Equation (5) the $(H_0(i)/H)$ is equal to $H_0(i)$ with the elements of H removed since they are generated by the Tx-to-Rx communication links, $H_0(i)$ is the row vector $i=1, 2, \ldots, N$ of $H_0$, and the $[(H_0(i)/H) \circ C_0]$ space-time code is defined in FIG. 10. For Tx antenna labeled $i=1$ the signal processing following the space-time encoding in 130,131,132 starts with the splitting 133 of the complex signal into inphase (real) and quadrature (imaginary) components which are then modulated to generate a digital waveform, low pass filtered (LPF), and digital-to-analog converted (A/D) 134 to generate the analog inphase $x(t)$ and quadrature $y(t)$ signals 135 which are the components of the complex signal $z(t)=x(t)+j \circ y(t)$. This complex baseband analog signal $z(t)$ is single-sideband up-converted 136,137 to an IF frequency and then up-converted by the RF frequency front end to the RF signal $v(t|Tx\ 1)$ 138 for Tx antenna 1. Single sideband up-conversion of the baseband signal is performed by multiplication of the inphase signal $x(t)$ with the cosine of the carrier frequency $f_0$ 136 and the quadrature signal $y(t)$ by the sine of the carrier frequency 137 which is a 90 degree phase shifted version of the carrier frequency, and summing 138 to generate the real signal $v(t)$ 138. This signal processing is replicated for the other Tx antennas 139,140.

The Tx signal processing algorithms that are implemented as fast transforms to generate the encoded data symbols $Z(n)$ $n=0, 1, 2, \ldots, N_s-1$ from the input data symbols $Z(u)=R+jI$ $u=0, 1, 2, \ldots, N_s-1$ for each received block of $N_s$ data, are defined in Equation (5) for CDMA,OFDMA,OWDMA in the absence of 500 *CDMA Tx* (5)

$$Z(n) = CDMA \text{ encoded chip symbols for the } N_s \text{ user symbols}$$
$$\{Z(u)\} \text{ for } n = 0, 1, \ldots, (N_s - 1)$$
$$= \sum_u Z(u) \cdot C(u, n) \cdot P_2(n) \cdot P_1(n) \text{ where}$$
$$C = [C(u, n)] \ N_s x N_s \ CDMA \text{ code matrix for Walsh, Hybrid Walsh, generalized Hybrid Walsh}$$
$$C(u, n) = \text{chip } n \text{ for user code } u$$
$$P_1(n) = \text{chip } n \text{ of } P_1 \text{ short code}$$
$$P_2(n) = \text{chip } n \text{ of } P_2 \text{ long code}$$

501 $H(i)/H = H_0(i)$ with the elements of $H$ removed which means
$$h_{ik} = h(i, k) = 1 \text{ for all } i, k \text{ since they are generated}$$
by the $Tx$-to-$Rx$ links where
$$H(i) = \text{row } i \text{ of } H_0 \text{ for } i = 1, 2, \ldots, N$$

502 *OFDMA Tx*

$$Z(n) = OFDMA \text{ encoded symbols for the } N_s \text{ user symbols}$$
$$\{Z(u)\} \text{ for } n = 0, 1, 2, \ldots, (N_s - 1)$$
$$= \sum_u Z(u) \cdot \exp(j \cdot 2 \cdot \pi \cdot u \cdot n / N_s)$$
$$= DFT^{-1}[\{Z(u)\}] \text{ inverse } DFT \text{ of } \{Z(u)\}$$

503 *OWDMA Tx*

-continued $$Z(n|q) = \text{OFDMA encoded symbols for } n = 0, 1, \ldots, (N_s - 1)$$
$$\text{over the interval from } n = 0 \text{ at } q \cdot N_s \text{ to } n = (N_s - 1) \text{ at}$$
$$(q+1) \cdot N_s - 1$$
$$= \sum_{\Delta} \sum_{u} Z(u | q + \Delta) \cdot \Psi(n | p = 0, q + \Delta, k) \text{ where}$$
$$\Psi(n | 0, q, k) = \Psi(n - q \cdot N_s) \cdot \exp[j \cdot 2 \cdot \pi \cdot k \cdot n / N_s]$$
$$= \text{Multi-resolution complex Wavelet for scale}$$
$$p = 0, \text{ shift } q, \text{ and for frequency } k, \text{ at digital}$$
$$\text{index } n$$
$$\Psi(n) = \text{Mother or baseband Wavelet at}$$
$$n = 0, 1, 2, \ldots, (N_s - 1)$$
$$\exp(j \cdot 2 \cdot \pi \cdot (u | q) \cdot n / N_s) = \text{Frequency translation of mother Wavelet}$$
$$Z(u | q + \Delta) = \text{Data symbol } u = 0, 1, \ldots, (N_s - 1) \text{ for}$$
$$\text{data set } q + \Delta \text{ at digital sample index}$$
$$q + \Delta$$

equalization. Fast transforms for the CDMA, OFDMA, OWDMA are defined in patent application Ser. No. 10/806,016 filed on Mar. 23, 2004.

FIG. 12 depicts a representative embodiment of the OFDMA transmitter signal processing for the forward and reverse links 6 between the base station and the users that implements the OFDMA encoding for OFDMA channelization, synchronization, tracking, and scrambling of the data for transmission by several antennas to implement MIMO and with applicability to Wi-Fi, WiMax, HSPDA, UWB, 3G, 4G and to other cellular standards. OFDMA for IEEE 802.11g is illustrated in FIG. 13. The channelization filter h(f) 301 covers a 20 MHz frequency band 302 assigned to OFDMA. Plotted is the power spectral density PSD=|h(f)|² 302 of this channelization filter h(f). A $N_s$=64 point $FFT^{-1}$ 303 covers this band 304. Consistent with the IEEE specification, FIG. 13 refers to the discrete Fourier transform (DFT) which is identical to the analog Fourier transform (FT) since it is the sampled data version of the FT. It is convenient to consider the DFT in this invention disclosure as the digital format for the FFT with the understanding that the FFT will be used to implement the FFT and the inverse $FFT^{-1}$ will be used to implement the inverse $DFT^{-1}$. The DFT frequency spectrum 303 consists of $N_s$=64 equally spaced filters 304 across this 20 MHz band. Filter spacing is equal to the DFT output rate $1/N_s \circ T_s$=0.3125 MHz=20 MHz/64. The DFT time pulse p(t) 305,306 is $N_s \circ T_s$=3.2 μs in length and the total DFT period 306 is 4.0 μs which allows a 0.8 μs guard time for p(t). OFDMA for IEEE 802.11g has the strict orthogonality of the DFT degraded by cross-correlations between the 48 channel tones and by other impacts due to the band channelization and pulse weighting p©h plus the time errors Δt and frequency errors Δf from synchronization errors, multi-path, propagation, and terminal stresses where p©h represents the convolution of p and h. These impacts on orthogonality are low enough to allow OFDMA to support the higher values for the symbol signal-to-noise ratio (S/N) in the detection band that are required for higher order symbol modulations. Transmitter DFT encoding is defined in 502 in Equation (5) and implemented in 143 in FIG. 12 as the inverse $FFT^{-1}$ of the set of $N_s$ complex input data symbols Z(u)=R+j∘I formed from the inphase data symbols R 141 and quadrature data symbols I 142. $FFT^{-1}$ outputs Z(n) 144 are parsed 145 into contiguous equal strips of N symbols and each set of N symbols is an "epoch" for space-time processing and are the components of the input vector X which is space-time processed to generate the N row vectors [(H₀(i)/H)∘C₀]∘X 146,147 of the space-time code [(H₀/H)∘C₀] for handover to the transmitter processing for the N Tx antennas. Remaining signal processing in 148-to-155 is identical to the corresponding signal processing in 133-140 in FIG. 11 with the exception that the OFDMA pulse in 305,306 in FIG. 13 is implemented by the LPF 134 in the Tx signal processing.

FIG. 14 depicts a representative embodiment of the OWDMA transmitter signal processing for the forward and reverse links 6 between the base station and the users that implements the OWDMA encoding for OFDMA channelization, synchronization, tracking, and scrambling of the data for transmission by several antennas to implement MIMO and with applicability to Wi-Fi, WiMax, HSPDA, UWB, 3G, 4G, and other cellular standards as extension capabilities. OWDMA is illustrated in FIG. 15 for an orthogonal multi-resolution OWDMA Wavelet polyphase filter bank over the band B 315 using $N_s$ OWDMA orthogonal and contiguous multi-resolution Wavelet filters 317 uniformly spread over the bandwidth $1/T_s$>B. Plotted in 315 is the power spectral density PSD=|h(f)|² of this channelization filter h(f) where h(f) is the DFT of the filter impulse response h(t) in time. The h(f) output is digitized at the sample rate $1/T_s$ to form the OWDMA multi-resolution complex Wavelet polyphase filter bank 316 with contiguous orthogonal filters uniformly spaced 317 at $1/N_s \cdot T_s$ Hz over the complex sample rate frequency band $1/T_s$ 318. This $1/T_s$ is sufficiently large to allow the use of the shaded OWDMA filters in 317 in FIG. 15 for communications over the band B with no excess bandwidth α=0 unlike the OFDMA in FIG. 13 which has the excess bandwidth α=(20 MHz/64 channels)∘(4 μs)−1=0.25 and for CDMA which typically has an excess bandwidth at least α=0.25. The α is calculated from the equation of definition B∘$T_s$=1+α for single channels where B and $T_s$ are the bandwidth in frequency and the symbol repetition interval in seconds. This OWDMA polyphase filter bank 316 is ideally decimated since the filter output multi-resolution complex Wavelet sample rate $1/N_s \cdot T_s$ is the channel-to-channel spacing $1/N_s \cdot T_s$ with no excess bandwidth α=0 within the filter bank. A representative 319 OWDMA multi-resolution complex Wavelet ψ defined in Equation (5) is plotted in 320 as a function of the time offset expressed in units of the multi-resolution complex Wavelet spacing $N_s \circ T_s$. The multi-resolution Wavelet transform equation 503 in Equation (5) calculates the output of the OWDMA multi-resolution Wavelet filter bank depicted in 316 which is the set of $N_s$ encoded data symbols $Z(n)$ in 316 and in 204 in FIG. 14. The implementation of the OWDMA multi-resolution Wavelet filter bank in 203 in FIG. 14 is the OFDMA fast multi-resolution Wavelet transform over the set of $N_s$ input symbols from the turbo encoding, interleaving, formatting, and symbol encoding in the transmitter in 102 in FIG. 9 and these input symbols are received as the inphase data symbol R 201 and quadrature data symbol I 202 components of the complex symbol $Z(u)= R+j \circ I$.

Equation (6) defines multi-resolution complex Wavelets $\psi$ starting with the definition 510 for the continuous (or analog) real Wavelet over the time-frequency t-f space where $\psi(t)$ is a waveform of finite extent in time t and frequency f over the t-f space and parameters a,b are the dilation and translation respectively or equivalently are the scale and shift. The $\psi(t)$ without the indices a,b is the mother Wavelet which is a real and symmetric localized function in the t-f space used to generate the doubly indexed Wavelet $\psi(t|a,b)$ where $\psi(t|a,b)$ reads the $\psi$ is a function of time t for the parameters a,b. Scale factor $|\alpha|^{-1/2}$ has been chosen to keep the norm of the Wavelet invariant under the parameter change a,b. Norm is the square root of the energy of the Wavelet response. Wavelets $\psi(t|a,b)$ and $\psi(t)$ are localized functions in the t-f space with their time and frequency lengths bounded. In 511 the Wavelet is defined in digital format as a function of the mother Wavelet with the digital sample index n=0, +/−1, +/−2, . . . . Digital scale and shift parameters p,q are related to the a,b by the mappings $a=2^p$ and $b=q \circ N_s \circ 2^p$ where $N_s$ is the shift interval for q. In 512 the multi-resolution complex Wavelet introduced is defined as a function of the mother Wavelet in a general format for the multi-rate filter bank and in a simplified format for the OWDMA uniform filter bank in FIGS. 14,15. Parameter $N_s$ is the multi-resolution Wavelet spacing and also equal to the number of multi-resolution Wavelet filters 317 in FIG. 15, parameter q is the index of for the contiguous multi-resolution Wavelets spaced at $N_s$ intervals, and for reference the length of the mother Wavelet $\psi(n)$ 320 in FIG. 15 is L=8 in units of $N_s$ meaning that $\psi(n)$ extends from −4 to +4 in units of $N_s$. In 510 Current analog real Wavelet $\Psi(t|a, b)$ (6

$$\Psi(t|a, b) = |a|^{-1/2} \Psi((t - b)/a)$$

where $a$ = dilation (scale) parameter $b$ = shift parameter

511 Current digital real Wavelet $\Psi(n|p, q)$ $$\Psi(n|p, q) = 2^{-p/2} \Psi(2^{-p} \cdot n - q \cdot N_s)$$

where $p$ = scale (dilation) parameter $q$ = shift parameter

512 Multi-resolution complex Wavelet in digital format

Multi-rate filter format $$\Psi(n|p, q, k) = 2^{-p/2} \Psi(2^{-p} i - q \circ N_s) \circ \exp [j \circ 2 \circ \pi \circ k \circ i / N_s]$$

Uniform filter bank format $$\Psi(n|p = 0, q, k) = \Psi(n - q \bullet N_s) \circ \exp[j \bullet 2 \bullet \pi \bullet k \bullet i / N_s]$$

503 in Equation (5) the mother Wavelets $\psi(n-q \cdot N_s)$ for the multi-resolution Wavelets at q=0, +/−1, +/−2, +/3 contribute to the Wavelet transform of $W(n)$ in the summation over q in the equation that calculates the filter bank outputs $Z(n)$. The multi-resolution Wavelets and the fast transform implementation 203 have been defined in the patent application Ser. No. 09/826,117 filed on Sep. 1, 2002.

FIG. 14 encoded data symbols $Z(n)$ 204 from the OWDMA filter bank are parsed 205 into contiguous equal strips of N symbols and each set of N symbols is an "epoch" for space-time processing and are the components of the input vector X which is space-time processed to generate the N row vectors $[(H_0(i)/H) \circ C_0] \circ X$ 206,207 of the space-time code $[(H_0/H) \bullet C_0]$ for handover to the transmitter processing for the N Tx antennas. Remaining signal processing in 208-to-215 is identical to the corresponding signal processing in 133-140 in FIG. 11 with the exception that the OWDMA band filter h(f) in 314 in FIG. 14 is implemented by the LPF 209 in the Tx signal processing.

FIGS. 16,17,18 depict representative CDMA, OFDMA, OWDMA Rx space-time implementations for the cellular communications links 6 in FIG. 1. Equation (7) defines the multiple-access and space-time signal processing to support these implementations. FIG. 16 depicts a representative embodiment of the CDMA receiver signal processing for the forward and reverse links 6 between the base station and the users for CDMA2000, W-CDMA, 3G, 4G that implements the CDMA decoding for the Hybrid Walsh used for CDMA channelization, synchronization, tracking, and scrambling of the data transmitted by the MIMO antennas. Depicted are the principal signal processing that is relevant to this invention disclosure. Signal input $\hat{v}(t|Rx\ 1)$ 160 for Rx antenna 1 is the received estimate of the transmitted CDMA signals $v(t|Tx\ 1), \ldots, v(t|Tx\ N)$ 138,140 in FIG. 11. The signal is handed over to the inphase mixer which multiplies $\hat{v}(t|Rx\ 1)$ by the cosine 161 of the carrier frequency $f_0$ followed by a low pass filtering (LPF) 163 which removes the mixing harmonics, and to the quadrature mixer which multiplies $\hat{v}(t|Rx\ 1)$ by the sine 162 of the carrier frequency $f_0$ followed by the LPF 163 to remove the mixing harmonics. These inphase 161 and quadrature 162 mixers followed by the LPF perform a Hilbert transform on $\hat{v}(t|Rx\ 1)$ to down-convert the signal at frequency $f_0$ and to recover estimates $\hat{x}, \hat{y}$, 163 of the inphase component x(t) and the quadrature component y(t) of the transmitted complex baseband CDMA signal $z(t)=x(t)+j \circ y(t)$. The $\hat{x}(t)$ and $\hat{y}(t)$ baseband signals are digital-to-analog (D/A) 164 converted and demodulated (demod.) to recover the transmitted inphase and quadrature components of the complex signal $Y_1$. The other Rx antennas recover the signal components $Y_2, \ldots, Y_M$ which are de-muxed 165 to form the Rx symbol vector Y 168 which is then processed by solving the ML equation in FIG. 8 to find the estimate $\hat{X}$ 169 of X.

FDE equalization 170 processes the X to recover the Rx equalized estimates $\hat{Z}(n)$ 170 of the Tx CDMA encoded data chips (symbols) $Z(n)$ in 129 in FIG. 11. Rx FDE equalization takes the FFT of the frequency encoded CDMA symbols, performs FDE equalization on these recovered CDMA symbols, and parallel-to-serial (P/C) multiplexes (mux) the outputs $\hat{Z}(n)$ for CDMA decoding. As defined in 520 in Equation (7) the CDMA decoding multiplies the $\hat{Z}(n)$ by the complex conjugate $P_1^*$ of the short code 171 and the complex conjugate $P_2^*$ of the long code 172 to remove these codes, and performs the Hybrid Walsh decoding 173 to recover the Rx estimates $\hat{R}, \hat{I}$ 174,175 of the Tx real R and imaginary I data input symbols in 121,122 in FIG. 11.

FIG. 17 depicts a representative embodiment of the OFDMA receiver signal processing for the forward and reverse links 6 between the base station and the users that implements the OFDMA decoding for OFDMA channelization, synchronization, tracking, and scrambling of the data for transmission by several antennas to implement MIMO and with applicability to Wi-Fi, WiMax, HSPDA, UWB, 3G, 4G, and other cellular standards as extension capabilities. Depicted are the principal signal processing that is relevant to this invention disclosure. Rx signal processing 180-189 is identical to the Rx signal processing 160-169 in FIG. 16 and recovers the ML estimate $\hat{X}$ 189 of X. Components of X are the Rx estimates $\hat{Z}(n)$ 190 of the Tx OFDMA encoded data symbols Z(n) in 144 in FIG. 12 and the multiplex (mux) operation 190 multiplexes the components of $\hat{X}$ into the contiguous stream $\hat{Z}(n)$. As defined in 521 in Equation (7) the OFDMA decoding takes the scaled FFT 191 over each block of $N_s$ symbols $\hat{Z}(n)$. FFT outputs are FDE equalized and P/S multiplexed to recover the Rx equalized estimates $\hat{R}$, $\hat{I}$ 192, 193 of the Tx real R and imaginary I data input symbols in 141,142 in FIG. 12.

FIG. 18 depicts a representative embodiment of the OWDMA receiver signal processing for the forward and reverse links 6 between the base station and the users that implements the OWDMA decoding for OWDMA channelization, synchronization, tracking, and scrambling of the data for transmission by several antennas to implement MIMO and with applicability to Wi-Fi, WiMax, HSPDA, UWB, 3G, 4G, and other cellular standards as extension capabilities. Depicted are the principal signal processing that is relevant to this invention disclosure. Rx signal processing 220-229 is identical to the Rx signal processing 160-169 in FIG. 16 and recovers the ML estimate $\hat{X}$ 229 of X. Components of X are the Rx estimates $\hat{Z}(n)$ 230 of the Tx OWDMA encoded data symbols Z(n) in 204 in FIG. 14 and the multiplex (mux) operation 230 multiplexes the components of $\hat{X}$ into the contiguous stream $\hat{Z}(n)$. As defined in 522 in Equation (7) the OWDMA decoding takes the scaled fast multi-resolution Wavelet inverse transform 231 of the symbols $\hat{Z}(n)$ and performs WDE equalization to generate the Rx equalized estimates $\hat{R}$, $\hat{I}$ 232,233 of the Tx real R and imaginary I data input symbols in 201,202 in FIG. 14.

The Rx signal processing algorithms that are implemented as fast transforms to generate the Rx estimates $\hat{Z}(u)$ of the data symbols $Z(u)$ u=0, 1, 2, ..., $N_s$–1 from the Rx estimates $\hat{Z}(n)$ of the encoded data symbols $Z(n)$ n=0,1,2 ..., $N_s$–1 for each received block of $N_s$ data symbols, are defined in Equation (7) for CDMA,OFDMA,OWDMA without equalization. Fast transforms for CDMA,OFDMA,OWDMA are defined in patent application Ser. No. 10/806,016 filed on Mar. 23, 2004. In 522 the inverse multi-resolution Wavelet transform calculates the Rx estimates $\hat{Z}(u|q)$ for offset q=0, +/–1, +/–2, ... of the corresponding $N_s$ transmitted data symbols Z(u|q) in the Tx by multiplying the $\hat{Z}(n|q+\Delta)$ by the complex conjugate of the multi- $$520 \; CDMA \; Rx \qquad (7)$$

$\hat{Z}(u) = Rx$ estimates of the $Tx \; CDMA$ encoded data symbols $Z(u)$ for $n = 0, 1, \ldots, (N_s - 1)$ $= (1/N_s) \cdot \sum_n \hat{Z}(n) \cdot C^*(u, n) \cdot P_1^*(n) \cdot P_2^*(n)$ where "*"

denotes conjugation $\hat{Z}(n) = Rx$ estimate of the $Tx \; Z(n)$ $521 \; OFDMA \; Rx$ $\hat{Z}(u) = Rx$ estimates of the $Tx \; OFDMA$ encoded data symbols $Z(u)$ for $n = 0, 1, \ldots, (N_s - 1)$ $= (1/N_s) \cdot \sum_n \hat{Z}(n) \cdot \exp(-j \cdot 2 \cdot \pi \cdot u \cdot n/N_s)$ $= DFT[\{\hat{Z}(n)\}]$ $522 \; OWDMA \; Rx$ $\hat{Z}(u \mid q) = Rx$ estimates of the $Tx \; OWDMA$ encoded data symbols $Z(u|q)$, $u = 0, 1, \ldots, (N_s - 1)$ $= (1/N_s) \cdot \sum_\Delta \cdot \sum_n \hat{Z}(n|q + \Delta) \cdot \Psi^*(n|p = 0, q + \Delta, k)$ where $\Psi^*(n \mid 0, q + \Delta, k) = \Psi(n - (q + \Delta) \cdot N_s) \cdot \exp[-j \cdot 2 \cdot \pi \cdot k \cdot n/N_s]$ = Multi-resolution complex Wavelet for scale $p = 0$, shift $q + \Delta$, and for frequency $k$, at digital index $n$ $\hat{Z}(n \mid q + \Delta) = Rx$ estimate of the $OWDMA$ Dencoded symbols $Z(n \mid q + \Delta)$ for $n = 0, 1, \ldots ,$ resolution Wavelet and summing over the q interval as well as the q+Δ intervals over which the multi-resolution extends as per the definition in 512 in Equation (6).

4. Transparency to Scintillation, Dispersion, Fading, Multipath

Solutions for the ML estimate define $\hat{X}$ to be a linear function of the observation Y and also Y* when the linear operator L appears in the $C_0$ formulation, with the coefficients of the linear equation determined by the ML solutions in FIG. 8. Equation (8) gives the linear scalar equations which are the scalar form of the linear matrix MIMO equations in 48 in FIG. 4C for Scenario 1, in 65 in FIG. 5B for Scenario 2, 74 in FIG. 6B for Scenario 3, and in 84 in FIG. 7B for Scenario 4, and gives the linear scalar equations which are the scalar form of the linear matrix ML solutions in FIG. 8. In 523 the space time matrix $H_0 \circ C_0$ transmission coefficients $H_0 \circ C_0(m,n)$ are partitioned $H_0 \circ C_0(m,n) = H_1(m,n) + H_2(m,n) \circ L$ into the sum of the elements $\{H_1(m,n)\}$ of $H_1$ plus the elements $\{H_2(m,n)\}$ of $H_2$ as defined in 48 in FIG. 4C. In 524 the coefficients $\{G(n,m)\}, \{G_1(n,m)\}, \{G_2(n,m)\}$ are defined by the corresponding matrix equations in FIG. 8. Acquisition and synchronization and calibration measurements will

523 MIMO Rx scalar equations
Scenario 1 with L $$Y_m = \Sigma_n [H_1(m,n) \circ X_n \star] + N_o(m)$$

Scenarios 1,2,3,4 without L $$Y_m = \Sigma_n H_0 \bullet C_0(m,n) \bullet X_n + N_o(m)$$

524 MIMO ML scalar equations
Scenario 1 with L $$\hat{x}_n \Sigma_m [G_1(n,m) \bullet Y_m + G_2(n,m) \bullet Y_m \star]$$

Scenarios 1,2,3,4 without L $$\hat{x}_n = \Sigma_m G(n,m) \bullet Y_m \qquad (8)$$

be used to estimate the complex values of the $\{H(m,n)\}$ used to defined $\{H_0 \bullet C_0(m,n)\}$ as well as the signal dispersion, interference, and multipath delayed signal interference. Equalization signal processing to address the signal dispersion and interference can be implemented on the Rx data set $\{Y_m(i)$, for time epochs $i=0, +/-1, +/-2 \ldots\}$ since the Rx data set is linear in the Tx data $\{X_m(i)$, for time epochs $i=0, +/-1, +/-2 \ldots\}$. Likewise the multipath processing can performed on this Rx data set. FDE equalization for CDMA (including MC-CDMA) and OFDMA and WDE equalization are illustrated in the Tx FIGS. 11,12,14 and the Rx FIGS. 16,17,18. The ability to correct the signal dispersion, interference, and multipath before and/or after the ML signal processing is a transparency property of this invention disclosure.

It should be obvious to anyone skilled in the communications art that the example implementations in FIG. 1-18 clearly define the fundamental signal processing relevant to this invention disclosure and it is obvious that this example is representative of the other possible signal processing approaches. In particular this invention disclosure applies to the use of the MC-CDMA variation of CDMA with FDE equalization, OFDMA with FDE, OWDMA with WDE and other signal processing for equalization to compensate for scintillation, fading, and multipath.

What is claimed is:

1. A method for the design and implementation of maximum-likelihood (ML) architecture for MIMO systems with M receive antennas and N transmit antennas and with epoch T>1, comprising the steps:

constructing the new space-time TM×TN transmission matrix $H_0$ as the matrix-diagonal matrix generated by the tensor product of the T×T identity diagonal matrix with the M×N transmission matrix H to generate the TM×TN matrix $H_0$ whose matrix elements on the diagonal are the H and zeros elsewhere and wherein symbol "T" is the number of time epochs which are the number of repeated transmissions, symbol "TM×TN" reads "TM rows by TN columns", transmission matrix H has transmission elements $h_{i,j}$ which measure the transmitter, path, and receiver transmission loss from transmitter j in column j=1,...,M to receiver i in row i=1,...,M, transmission elements $h_{i,j}$ are complex measurements of the transmission loss from j to i, and a matrix-diagonal matrix has matrices along the diagonal and zeros elsewhere;

constructing the new space-time TN×N code matrix $C_0$ as the matrix product $C_0 = A \bullet B$ of a TN×TN matrix A with a TN×N matrix B and wherein symbol "•" is a matrix or vector product, matrix A is the TN×TN matrix-diagonal matrix whose diagonal matrix elements are the T N×N diagonal matrices $A_1, \ldots, A_T$, matrices $A_n$ for n=1, ..., T are orthogonal matrices satisfying $A_n' \bullet A_n = NI_N$ wherein $A_n'$ is the conjugate transpose of $A_n$ and $I_N$ is the N×N identity diagonal matrix, matrix $B = [B_1; \ldots ; B_N]$ is the TN×N matrix whose elements are the N×N orthogonal matrices $B_1, \ldots, B_T$ each with elements including L and using the Matlab construction operator ";" for stacking matrices, vectors, or elements in a column format, matrices $B_n$ for n=1, ..., T are orthogonal matrices with the property $B_n' \bullet B_n = NI_N$, matrix element "L" is the new complex-conjugate operator defined by the operation "L(w)= w*=complex-conjugate of the element w" and L(L(w))=w, space-time TN×N code matrix $C_0$ satisfies the orthogonality equation $C_0' \bullet C_0 = NI_N$ for the column vectors of $C_0$ wherein "(o)'" is the complex-conjugate transpose of (o), current space-time TN×1 codes C combine the space-time codes and the transmitted data symbols, current space-time codes C cannot be factored into the product of a code matrix with the transmitted data symbol vector except for a few codes, space-time code matrix $C_0$ architecture enables all known space-time codes C to be represented by the $C_0 \bullet X$ architecture wherein X is the N×1 transmitted signal column vector and which means there exists a $C_0$ that satisfies the identity $C = C_0 \bullet X$ for all existing space-time codes C and for all future space-time codes C, and factorization of the code matrix and the transmitted data symbol vector is a requirement for a ML solution;

using an alternate construction of the new space-time TN×N code matrix $C_0$ as the matrix $C_0 = [A_1 \bullet B_1; \ldots ; A_N \bullet B_N]$ whose elements are the N×N matrix products $A_n \bullet B_n$ for n=1 , , , , , T wherein the matrices $A_n$, $B_n$ and the operator ";" are defined in the previous;

constructing the new linear MIMO matrix transmission equation for the TM×1 output received data symbol vector Y $$Y = H_0 \bullet C_0 \bullet X + N_o$$

which factors out the input transmitted N×1 data symbol vector X and replaces the current MIMO matrix equation $Y=HC+N_o$ wherein current MIMO practice does not factor the H and C into a matrix product since it is difficult to separate the elements of H and C and which means HC is the current MIMO TM×1 encoded data vector input whose elements are the space-time encoded data symbol elements multiplied by the appropriate transmission elements, receive TM×1 data symbol vector $Y=[y(1,1); \ldots; y(M,1); y(M,2); \ldots; y(M,T)]$ elements are the detected data symbol values $y(m,i)$ indexed on the receive antenna $m=1,\ldots,M$ and the time epoch $i-1,\ldots,T$ for the MIMO signal set being addressed, transmitted N×1 data symbol column vector $X=[X_1; \ldots; X_N]$ elements are the set of N data signals $X_n$ being transmitted over T time epochs, and $N_o$ is the TM×1 receive noise vector;

implementing a new ML solution to $Y=H_0 \cdot C_0 \cdot X + N_o$ to derive the estimate $\hat{X}$ of X by solving the ML equation when L is absent $$\hat{X}=[(H_0C_0)'Q^{-1}(H_0C_0)]^{-1}(H_0C_0)'Q^{-1}Y$$

wherein $Q=E\{N_0N_0'\}$ is the noise covariance, $E\{o\}$ is the mathematical expectation of "o", assuming the determinant $\det(H_0' \cdot H_0) \neq 0$ and $\det(C_0' \cdot C_0) \neq 0$, and when the TM×1 receive noise vector $N_o$ is zero-mean additive white Gaussian noise (AWGN) with no cross-correlation this estimate reduces to $$\hat{X}=[(H_0C_0)'(H_0C_0)]^{-1}(H_0C_0)'Y$$

and for the applications where $(H_0C_0)$ is a square matrix and assuming the determinant $\det(H_0C_0) \neq 0$ reduces the solution to $$\hat{X}=(H_0C_0)^{-1}Y; \text{ and}$$

implementing a new ML solution to $Y=H_0 \cdot C_0 \cdot X + N_o$ to derive the estimate $\hat{X}$ of X by solving the ML equation with L present $$\hat{X}=[H_2^{-1} \cdot H_1 - H_1^{*-1} \cdot H_2^*]^{-1} \cdot [H_2^{-1} - H_1^{*-1} \cdot L] \cdot Y$$

wherein by definition $$H_0 \cdot C_0 = H_1 + H_2 \cdot L$$

assuming the determinant $\det((H_0 \cdot C_0)'(H_0 \cdot C_0)) \neq 0$, the TM×1 receive noise vector $N_o$ is AWGN with no cross-correlation, and the determinant $\det(H_1' \cdot H_1) \neq 0$ and $\det(H_2' \cdot H_2) \neq 0$.

2. The method of claim 1 with the epoch T equal to 1, further comprising the steps:

setting the new space-time M×N transmission matrix $H_0$ equal to the M×N transmission matrix H whose elements elements $h_{i,j}$ are the complex measurements of the transmission loss from transmitter j in column $j=1,\ldots,M$ to receiver i in row $i=1,\ldots,M$;

constructing the new space-time N×N code matrix $C_0$ as the generalized complex Walsh orthogonal matrix with orthogonal vectors along the column elements or alternately as another orthogonal matrix or semi-orthogonal matrix with vectors along the column elements and including complex-conjugate linear operator elements L wherein the semi-orthogonal property is the statistical orthogonality of random codes and wherein N×N space-time codes are orthogonal $C_0' \cdot C_0 = NI_N$ for the class of orthogonal codes and are semi-orthogonal for the class of semi-orthogonal statistical codes which means that in the statistical sense $E\{C_0 \cdot C_0\} = NI_N$;

constructing the new linear MIMO matrix transmission equation for the M×1 output received data symbol vector Y $$Y=H_0 \cdot C_0 \cdot X + N_o$$

which factors out the input transmitted N×1 data symbol vector X and replaces the current MIMO matrix equation $Y=HC+N_o$;

implementing a new ML solution to $Y=H_0 \cdot C_0 \cdot X + N_o$ to derive the estimate $\hat{X}$ of the input data symbol vector X by solving the ML equation when L is absent $$\hat{X}=[(H_0C_0)'Q^{-1}(H_0C_0)]^{-1}(H_0C_0)'Q^{-1}Y$$

assuming $\det((H_0C_0)' \cdot (H_0C_0)) \neq 0$ which is a requirement for the ML solution to exist, and when the TM×1 receive noise vector $N_o$ is AWGN with no cross-correlation this estimate reduces to $$\hat{X}=N^{-1}C_0'(H_0'H_0)]^{-1}H_0'Y;$$

implementing a new ML solution to $Y=H_0 \cdot C_0 \cdot X + N_o$ to derive the estimate $\hat{X}$ of X by solving the ML equation when L is absent and M=N $$\hat{X}=N^{-1}C_0'[H_0'Q^{-1}H_0]^{-1}H_0'Q^{-1}Y;$$

assuming $\det(H_0) \neq 0$ which is a requirement for the ML solution to exist, and when the TM×1 receive noise vector $N_o$ is AWGN with no cross-correlation this estimate reduces to $$\hat{X}=N^{-1}C_0H_0^{-1}Y;$$

implementing a new ML solution to $Y=H_0 \cdot C_0 \cdot X + N_o$ to derive the estimate $\hat{X}$ of X by solving the ML equation with L present $$\hat{X}=[H_2^{-1} \cdot H_1 - H_1^{*-1} \cdot H_2^*]^{-1} \cdot [H_2^{-1} - H_1^{*-1} \cdot L] \cdot Y$$

wherein by definition $$H_0 \cdot C_0 = H_1 + H_2 \cdot L$$

assuming the determinant $\det((H_0 \cdot C_0)'(H_0 \cdot C_0)) \neq 0$ which is a requirement for the ML solution to exist, the M×1 receive noise vector $N_o$ is AWGN with no cross-correlation, and $\det(H_1' \cdot H_1) \neq 0$ and $\det(H_2' \cdot H_2) \neq 0$.

3. The method of claim 1 or 2 for the design and implementation of the new ML architecture for MIMO systems, with the following properties:

orthogonal space-time codes $C_s$ are a larger class of space-time codes than the class of current space-time code C which include the code and the input data symbol elements of the input vector X;

orthogonal space-time codes $C_0$ do not have a data rate loss with diversity;

linear complex conjugate operator L is included in the selection of elements for the construction of $C_0$;

space-time transmission matrix $H_0$ is a generalization of the transmission matrix H which enables the current MIMO encoded data vector HC to be written $HC=H_0 \cdot C_0 \cdot X$ to factor out the input transmitted data symbol vector X which format supports a ML solution for the estimate $\hat{X}$ of X when the determinant $\det(H_0'H_0) \neq 0$;

MIMO matrix equation $Y=H_0 \cdot C_0 \cdot X + N_o$ factors out X and allows a direct ML calculation of the estimate $\hat{X}$ of X wherein Y, X, $N_o$ are the received data vector, transmitted data vector, and the received noise power density vector; and multiple access encoding combined with orthogonal space-time encoding $C_0$ uniformly spreads the transmitted data symbols over each X to improve bit error rate (BER) communications performance.

4. The method of claim 1 or 2 for the design and implementation of the new ML architecture for MIMO systems using multiple access code division multiple access (CDMA) or equalizer variations including multi-carrier CDMA (MC-CDMA), orthogonal frequency division multiple access (OFDMA), orthogonal Wavelet division multiple access (OWDMA) and using waveforms that include multi-resolution Wavelets and with Walsh, Hybrid Walsh, generalized Hybrid Walsh orthogonal and quasi-orthogonal codes for CDMA and with the following properties:

- new orthogonal space-time codes $C_0$ do not have a data rate loss with diversity and are a larger class of space-time codes than the class of current space-time codes C;
- new linear complex conjugate operator is included in the selection of elements for the construction of the space-time codes;
- new generalization $H_0$ of the transmission matrix H enables the determinant $det(H_0'H_0) \neq 0$ to exist when this information exists in the transmission coefficients $h_{i,j}$ of the transmission matrix H;
- new formulation of the MIMO transmission equation $Y=H_0 \cdot C_0 \cdot X+N_o$ factors out the input transmitted data symbol vector X and supports a direct ML calculation of the estimate of $\hat{X}$ of X; and
- multiple access combined with the orthogonal space-time encoding uniformly spread the user data over the input signal to improve BER (bit error rate) communications performance.

5. The method of claim 1 or 2 for the design and implementation of the new ML architecture for MIMO systems supports the implementation of ML solutions for all combinations of N transmit antennas, M receive antennas, and time epoch T, with the following properties:

- ML architecture supports the implementation of all combinations of M,N,T parameters, transmission matrix H, and the input transmitted data symbol vector X which are solvable with acceptable communications performance;
- ML architecture supports an implementation which can accommodate M,N,T parameters, transmission matrix H, and input transmitted data symbol vector X that can change with the transmission elements and their solvability;
- ML architecture is transparent to the equalizer signal processing required to mitigate the effects of scintillation, dispersion, fading, and multipath;
- ML architecture supports communications using multiple access CDMA and equalizer variations including MC-CDMA, OFDMA, and OWDMA using waveforms that include multi-resolution Wavelets and with Walsh, Hybrid Walsh, generalized Hybrid Walsh orthogonal and quasi-orthogonal codes for CDMA and MC-CDMA;
- ML architecture supports communications using all current waveforms and multi-resolution Wavelet waveforms which optimize communication efficiency measured in units of symbols/second/H;
- ML architecture uses orthogonal space-time codes that do not have a data rate loss with diversity and are a larger class of space-time codes than the class of current space-time codes;
- ML architecture uses linear complex conjugate operator in the selection of elements for the construction of the space-time codes;
- ML architecture uses a generalization $H_0$ of the transmission matrix H that enables the transmission matrix or the matrix product with the space-time code to be square and invertible when this information exists in the transmission coefficients of the transmission matrix;
- ML architecture uses a novel formulation of the MIMO transmission equation $Y=H_0 \cdot C_0 \cdot X+N_o$ that factors out the input transmitted data symbol vector X and supports a direct ML calculation of the estimate of $\hat{X}$ of X; and
- ML architecture uniformly spreads the transmitted data symbols over the input signal to improve BER communications performance.

* * * * *